United States Patent [19]

Mama et al.

[11] Patent Number: 5,803,622
[45] Date of Patent: Sep. 8, 1998

[54] IMAGE FORMING DEVICE HAVING CONVENIENT ACCESS TO SERVICEABLE COMPONENTS

[75] Inventors: Takashi Mama; Takeshi Yamakawa, both of Tokyo, Japan

[73] Assignee: Ricoh Company, Ltd., Tokyo, Japan

[21] Appl. No.: 439,561

[22] Filed: May 11, 1995

[30] Foreign Application Priority Data

May 11, 1994 [JP] Japan .................................. 6-121840
Mar. 20, 1995 [JP] Japan .................................. 7-061285

[51] Int. Cl.⁶ .......................... G03G 15/00; G03G 21/00
[52] U.S. Cl. ............................ 399/4; 347/257; 347/263
[58] Field of Search ................... 399/1, 3, 4, 7, 399/137; 347/130, 138, 242, 257, 263

[56] References Cited

U.S. PATENT DOCUMENTS

| | | | |
|---|---|---|---|
| 4,800,401 | 1/1989 | Sato et al. ............................ | 347/242 |
| 4,868,673 | 9/1989 | Negoro ............................. | 347/263 X |
| 4,945,385 | 7/1990 | Kimura ............................. | 399/4 |
| 4,977,412 | 12/1990 | Komori et al. .................... | 347/257 |
| 5,028,957 | 7/1991 | Sakamoto .......................... | 399/4 |
| 5,495,281 | 2/1996 | Nashida et al. ................... | 347/263 |

FOREIGN PATENT DOCUMENTS 62-247675  10/1987  Japan .

*Primary Examiner*—Fred L. Braun
*Attorney, Agent, or Firm*—Lowe, Price, LeBlanc & Becker

[57] ABSTRACT

Servicing of an image forming device, such as a digital photocopier, is made convenient by providing an access opening exposing each of a number of prescribed serviceable components enclosed in a sealed casing. These serviceable components may include a light source scanner, lens group and beam detector. The casing bears removable cover units on the access openings. The serviceable components are located under the access openings, fixed in place by the cover units or elements attached to the cover units. Electrical switches coupled to the cover units may deactivate the components when the cover units are removed.

31 Claims, 24 Drawing Sheets

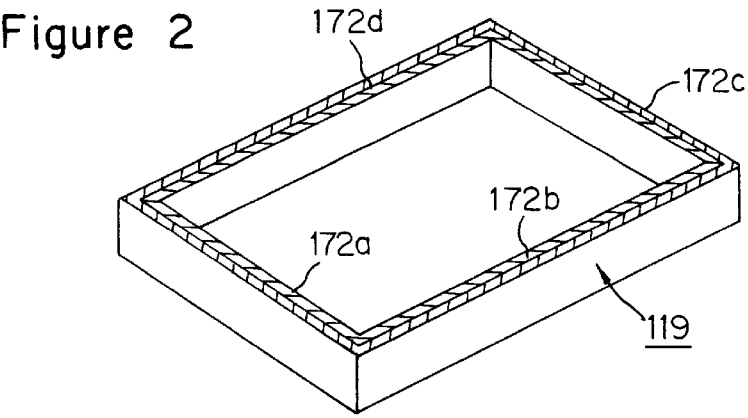
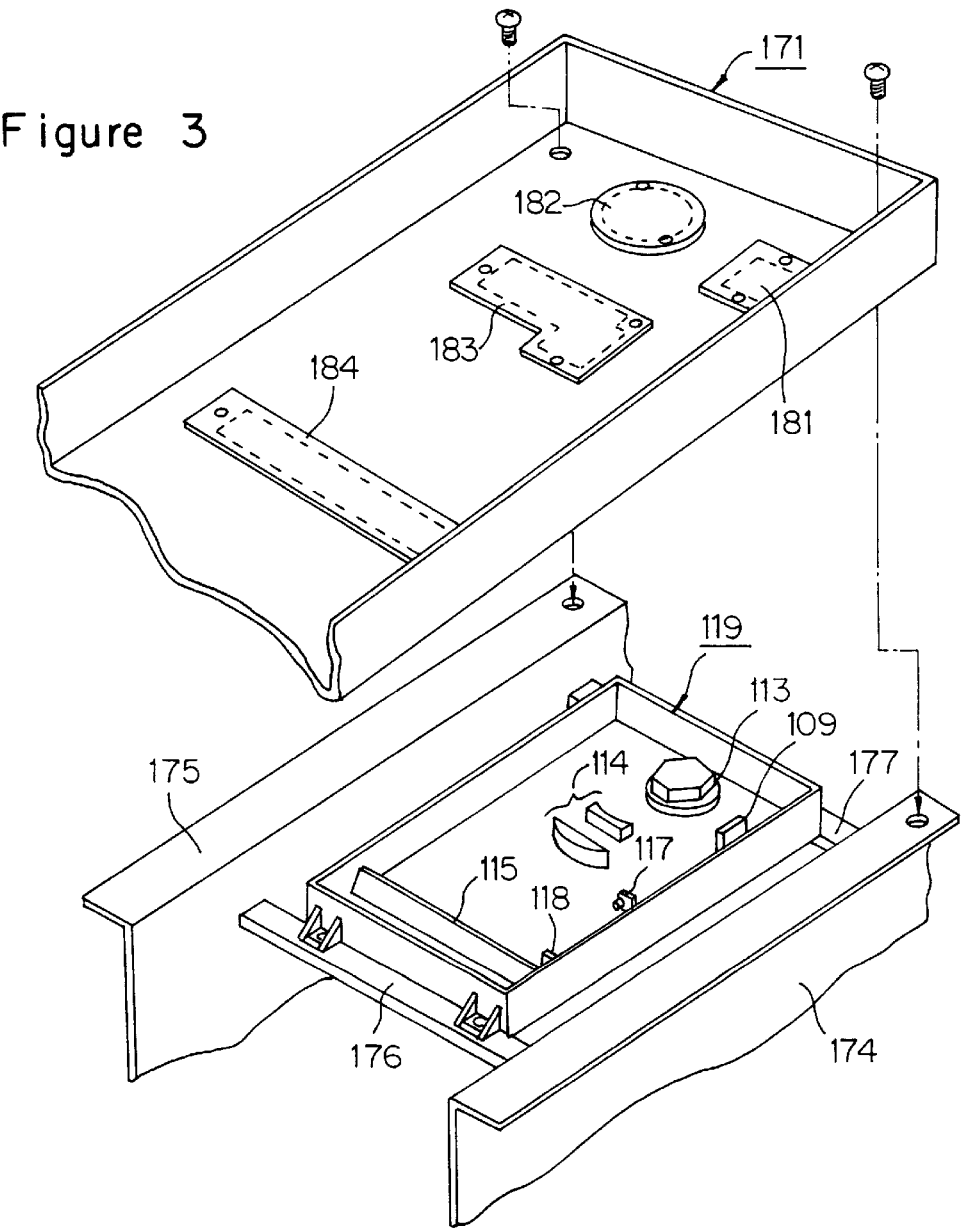

IMAGE FORMING DEVICE HAVING CONVENIENT ACCESS TO SERVICEABLE COMPONENTS

TECHNICAL FIELD

The present invention relates to the image forming section of an electronics photographing system, and particularly to such an image forming section having image reading and laser scanning devices or other components that occasionally require servicing.

BACKGROUND ART

Referring to FIG. 26, a conventional image forming device, such as a digital copying machine, to which the invention may be applied has an image reading section I to read image information from an original placed on a contact glass, a laser recording section II having an image making device (a photosensitive drum, a developing device, etc.) and a laser scanning device, and an automatic original feeding section (ADF) III, has been known. In the Figure, 401 indicates a laser scanning device, 402 a cover to tightly close the laser scanning device 401, and 403 a hinge part to install an image reading device I in a manner rotatable in the direction of arrow A in the drawing.

In general, the laser scanning device 401 comprises, as shown in FIG. 27, an LD (semiconductor laser light emitting element) 410 which is modulated according to image recording signals inputted from the image reading device I and emits pulse or intensity modulated, a collimator lens 411, a cylindrical lens 412, a polygon mirror 413, an f θ lens 414, a mirror 415 and a dust prevention glass 416 for directing the laser beam BM injected from the LD 410 to a photosensitive drum 420, a photo sensor 417 which is a beam detecting means to determine the image writing positions on the photosensitive drum 420, a mirror 418 for projecting a part of the laser beams BM on the photo sensor 417, and a casing 419 to house each part mentioned above. Here, the polygon mirror 413 is driven at a constant speed with a polygon motor not shown in the drawing. A deflecting system is formed with this polygon mirror 413 and a polygon motor.

As shown in FIG. 26 and FIG. 27, the laser scanning device 401 has each component element thereof such as the polygon mirror 413 and the f θ lens 414 housed within the casing 419, and the inside of the laser scanning device 401 is tightly enclosed by the dust prevention glass 416 and the cover 402.

Here, each one of the above mentioned component elements is, when positioned and fixed at a prescribed position within the casing 419, ordinarily either directly screwed down or fixed with other fixing members.

However, according to the prior art as mentioned above, when such parts as the polygon mirror 413 or the LD 410 within the laser scanning device 401 were serviced, for example replaced or the mirror 415 or the f θ lens cleaned, it was necessary to pivot the image reading section I in the direction of the arrow A around the hinge part 403 shown in FIG. 26 serving as the fulcrum and to remove the cover 402 for the laser scanning device 401. Hence, mechanical parts for rotating the image reading section I became necessary, which increased the cost of the device.

Also, while a method to move an image reading section in a lateral direction has been proposed as shown in the official gazette for Laid Open Patent Application TOKUKAI SHO 62247675, mechanical parts for moving the section have been necessary, which similarly increased cost.

Further, rigidity of the image reading section I is needed as the image reading section I is rotated, opened and closed, which increases the cost as well.

Also, in the prior art each component element was either directly screwed down or fixed with other fixing members at a prescribed position within the casing 419. The screws or other fixing members had to be removed for replacement of parts, which complicated the work involved.

DISCLOSURE OF THE INVENTION

The present invention was made in view of the above and has an object that replacement and cleaning of parts within a laser scanning device can be made without rotating or moving the image reading section, thus avoiding increase in cost.

As another object, replacement of parts within a laser scanning device can be made easily.

For achieving the above mentioned and other objects, an image forming device has an image reading section at least partially housed by a first casing for reading image information from an original and an exposure section housed by a second casing beneath the first casing for exposing a photosensitive body with the image information from the image reading section. The exposure section comprises at least a light source, a deflecting system to deflect a beam produced by the light source and optics to image the beam scanned by the deflecting system on the photosensitive body. At least one of the light source, deflecting system and optics is a serviceable component, and, in accord with the invention, at least one access opening is provided between the interiors of the first and second casings in a position opposing the serviceable element within the second casing. A cover member for covering each access opening is provided to enable access to the corresponding serviceable element, such as for cleaning or replacement. Preferably, wiring harnesses connected to the serviceable components are sufficiently long to enable the components to be partially removed through the access openings with the wiring maintained connected.

In a preferred embodiment, the first and second casings share a common wall therebetween within which the at least one access opening is formed. A seal may be provided between the first and second casings. Alternatively, the two casings may be vertically displaced from each other.

The serviceable component in the second casing may be fixed at a prescribed position by a part of one of the cover members or by a support member attached to the cover member.

In a preferred embodiment, the second casing and photosensitive body are mounted to a common body on chassis to maintain the exposure section and photosensitive body in registration with each other.

In accordance with an aspect of the invention, there are included switches which are turned ON/OFF in association with the attaching and removing of the cover members. Preferably, the switches control a circuit for prohibiting at least the driving of the image reading section, prohibiting at least light emission by the light source or prohibiting at least driving of the deflection system by opening the cover members.

BRIEF DESCRIPTION OF DRAWINGS

FIG. 2 shows a concrete example of a sealing member for the casing that houses the writing section of the copier.

FIG. 3 is an exploded view of an important part of the first embodiment of the present invention.

BEST MODE FOR CARRYING OUT THE INVENTION

Figure 1:
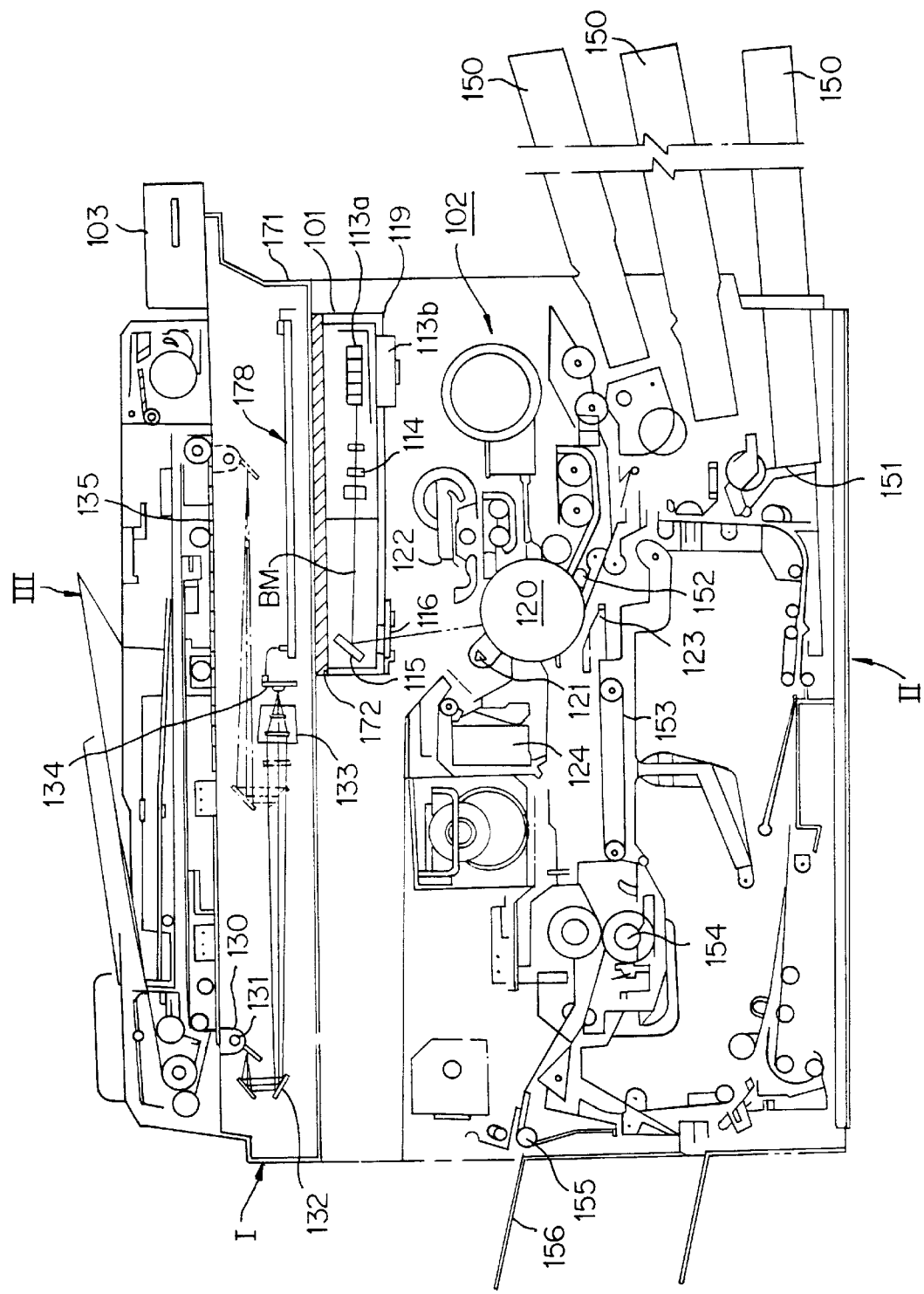
FIG. 1 is a schematic view to show an image forming device (a digital copying machine according to the present invention) of the first embodiment of the invention.

FIG. 1 shows the setup of, for example, a digital copying machine in accordance with a first embodiment of the invention, which comprises an image reading section I to read an image from an original placed on a contact glass 135, a laser recording section II which has an image making device 102 (a photosensitive drum 120, a developing device 122, etc., which are to be described later) and a laser scanning device 101, and an automatic original feeding section (ADF) III.

In this drawing, 101 is a laser scanning device using semiconductor laser light emitting elements (LD), 102 is an image making device which materializes latent images formed on the photosensitive drum 120 by the laser scanning device 101 and renders images of originals on a sheet of decalcomania paper, 130 is a scanner for scanning the original, 131 is an illumination lamp for illuminating the original, 132 represents plural mirrors to refract and guide the light reflected from the original, 134 is a CCD (one dimensional solid state image pick-up element), 133 is an imaging lens to form images for the images of the original on the CCD 134, and 135 is a contact glass.

When a copy start key (not shown in the drawing) is pushed after inputting copying data, such as the number of copies to be made, etc. by operating ten-keys (not shown in the drawing) on an operation display part 103, originals placed on the ADF 111 are fed one by one onto the contact glass 135 of the image reading section I.

The images of the original are read by the image reading section I after going through optical scanning by a scanner 130, and are converted to multi-gradation image data at an image processing part within an image processing board 178, and further converted to binary image data, then stored in image memories (not shown in the drawing). Then the image data are read and outputted at the laser recording section II.

At the laser recording section II, image recording signals corresponding to the binary image data are inputted into a laser driving part (not shown in the drawing) of the laser scanning device 101, and a laser driver which is modulated according to image recording signals drives LD (not shown in the drawing) in a pulsed manner or by intensity of light emission. Thus a photo modulated laser beam BM is produced The laser beam BM proceeds through a collimator lens and a cylindrical lens, not shown in the drawing, to be impinged on a polygon mirror 113a which is driven by a polygon motor 113b and deflected by constant speed rotation of the polygon mirror 113a. The beam BM then proceeds through an f θ lens 114, a mirror 115 and dust prevention glass 116, and is guided onto the photosensitive drum 120 where it scans over the photosensitive drum 120 in parallel with the drum's axis of rotation.

A portion of the laser beam BM which has been deflected by the rotation of the polygon mirror 113a is, after going through a mirror 118 which is to be described later, projected on a photo sensor 117 (refer to FIG. 3) which is a beam detecting means for determining image writing positions on the photosensitive drum 120, and detection signals are outputted from the photo sensor 117.

In the vicinity of the photosensitive drum 120, static photographing process units such as an electrifying charger 121, a developing device 122, a copy charger 123, etc. are respectively provided. The photosensitive drum 120, which has been uniformly charged by the electrifying charger 121, has a latent image for the recording image formed thereon by exposure to the laser beam BM. This latent image is developed by the developing device 122 and converted to a materialized image.

The decalcomania papers being taken out from a paper feeding cassette 150 by a paper feeding roller 151 have their ends straightened by a pressure roller 152 and are sent to a copying part in synchronism with the movement of the materialized image formed on the photosensitive drum 120. The materialized image formed on the photosensitive drum 120 is copied onto the decalcomania paper being transferred under the action of the copy charger 123. After that, the decalcomania paper which has the materialized image copied thereon is transferred by a transferring belt 153 and has a fixing treatment given thereon by a fixing roller 154, and is discharged onto a paper discharge tray 156 by a paper discharging roller 155. After copying is finished at the copying part, the surface of the photosensitive drum 120 is cleaned with a cleaning unit 124.

With continued reference to the drawing, 119 shows a casing for the laser scanning device 101, and each component element mentioned above such as the polygon mirror 113a, the f θ lens 114, the mirror 115, etc. are housed therein. This casing 119 in this embodiment is attached to a part of a casing (sheet metal) 171 of the image forming section I through a sealing member 172.

FIG. 2 shows a specific example of the sealing member 172, wherein four pieces of sealing members 172a, 172b, 172c, 172d are bonded as the sealing member 172 on the upper plane of a casing 119 of the laser scanning device 101 with double coated pressure sensitive adhesion tape (not shown in the drawing). The tight closing feature within the laser scanning device 101 can be secured by this sealing member 172 even if the flatness of the casing 171 of the image reading section I and the flatness of the casing 119 of the laser scanning device 101 are poor.

Next, the setup of important parts of the first embodiment of the present invention will be explained by referring to FIG. 3. In this drawing, 174 and 175 respectively show a front side plate and a rear side plate of the laser recording section II, and 176 and 177 show stays attached to the front•rear side plates 174, 175. The casing 119 of the laser scanning device 101 is fixed on the stays 176, 177. Also, the casing 171 of the image reading section I is installed to the front•rear side plates 174, 175 by screws as shown in the drawing. Also, as shown in FIG. 1 and FIG. 2, the inside of the casing 119 of the laser scanning device 101 is tightly closed with the sealing member 172 when the image reading section I is installed.

In FIG. 3, access openings are provided at the positions shown by broken lines at the casing 171 of the image reading section I, and covers 181, 182, 183, 184, are installed for covering these openings. The LD unit 109 within the laser scanning device 101 can be taken out through the access opening in the casing 171 of the image reading section I by removing the cover 181. Similarly, removal of the deflection system 113 (the polygon mirror 113a and the polygon motor 113b) and cleaning of the polygon mirror 113a can be made by removing the cover 118. Replacement and cleaning of both of the f θ lens 114 and the photo sensor 117 can be made by removing the cover 183, and the same for the mirror 115 can be made by removing the cover 184. Also, adjustment of the inclination of the mirror 118 can be made for adjusting the height of beam into the photo sensor 117. Here, each component element such as the LD unit 109, the deflecting system 113, the f θ lens, etc. are fixed to the casing 119 of the laser scanning device 101 with screws. Although not shown in the drawing, the circuit board carrying the electronic components for controlling machine functions preferably is not located in the casing 119 where it would interfere with access to the serviceable components. The circuit board may instead be located, for example, in the upper casing portion 171.

Now, whereas removal of both of the f θ lens 114 and the photo sensor 117 is allowed by removing the cover 183 in the embodiment shown in FIG. 3, separate openings and covers may be provided depending on the respective positional relationships. Further, when the positions of the f θ lens 114 and the deflecting system 113, et. are different from those in FIG. 3, the access openings and covers can naturally be so placed as allowing operations with different combinations taking the convenience of work into consideration.

Further, when it is determined that no such servicing as replacement and cleaning of parts will take place within the laser scanning device 101, the access openings and covers corresponding to such parts may be omitted. For example, when it is judged that the f θ lens 114 and the mirror 115 will not become stained during use as they are tightly closed in the laser scanning device 101 and no necessity exists for such service operations as taking them out, the covers 183, 184 the openings corresponding thereto are not needed.

Figure 4A:
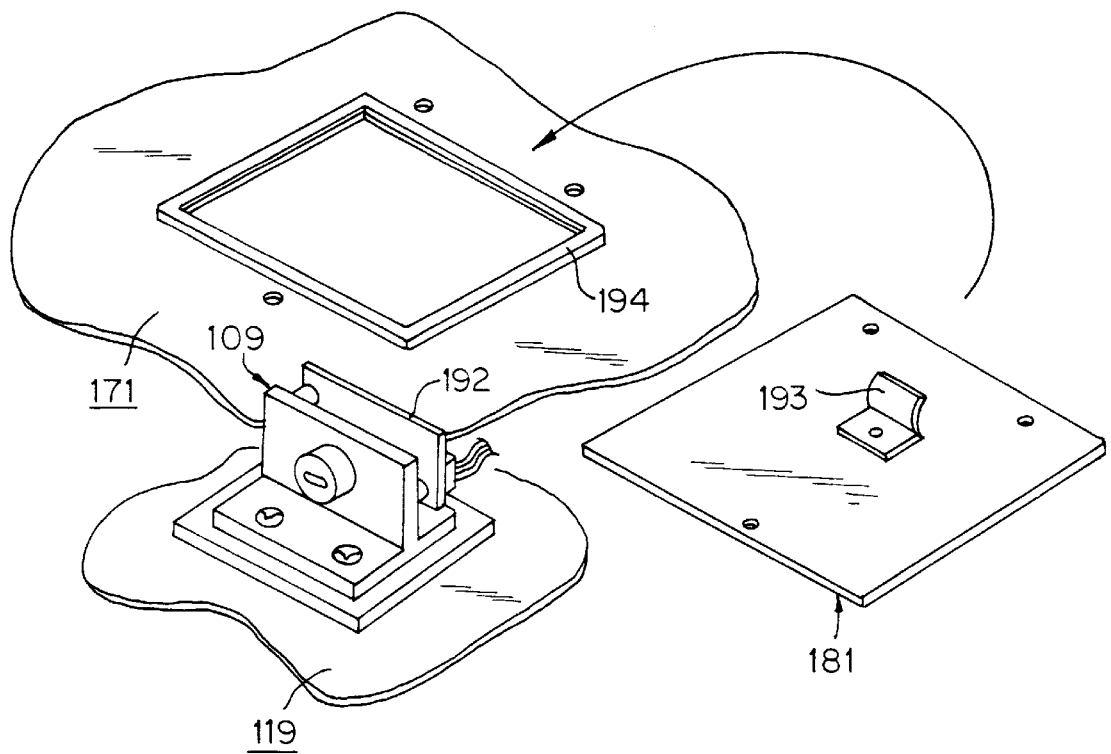
FIGS. 4(a) and (b) are more detailed views of an LD unit and a corresponding cover unit of the first embodiment.

An arrangement of the LD unit 109 and the cover 181 corresponding thereto will be explained in more concrete manner by referring to FIGS. 4(a), (b). Here, the LD unit 109 comprises a semiconductor laser light emitting element (LD), a collimate lens and an LD control board 192. Since the laser scanning device 101 modulates the LD at a high frequency, it could inflict radio frequency interference to other equipment. Therefor a necessity arises, for suppressing the radio frequency interference, to fortify grounding of the LD control board 192. Also, the casing 119 of the laser scanning device 101 is often made of plastics material because of the formability of its profile. This creates a situation that grounding to the LD control board 192 can not be made to the casing 119 of the laser scanning device 101 in many instances.

Figure 4B:
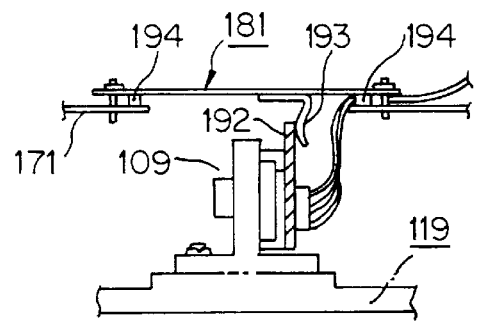

Therefore it is so arranged in the first embodiment that a flat spring 193 is provided at the cover 181. When the cover 181 is installed to the casing (sheet metal) 117 of the image reading section I, the flat spring 193 comes in contact with a GND pattern (not shown in the drawing) provided on the LD control board 192 as shown in FIG. 4(b), so that grounding can be made easily and securely thus suppressing emanation of radio frequency interference. Signal wires (harness) to the LD control board 192 are made to go through a space between the sealing member 194 which is bonded in place around the access opening perforated in the casing 171 of the image reading section I and the cover 118, as shown in FIG. 4(b), and is connected to the image processing board 178. The length of the harness is made large enough to enable the LD control board 192 to be partially removed through the access opening for servicing with the harness remaining connected.

Figure 5A:
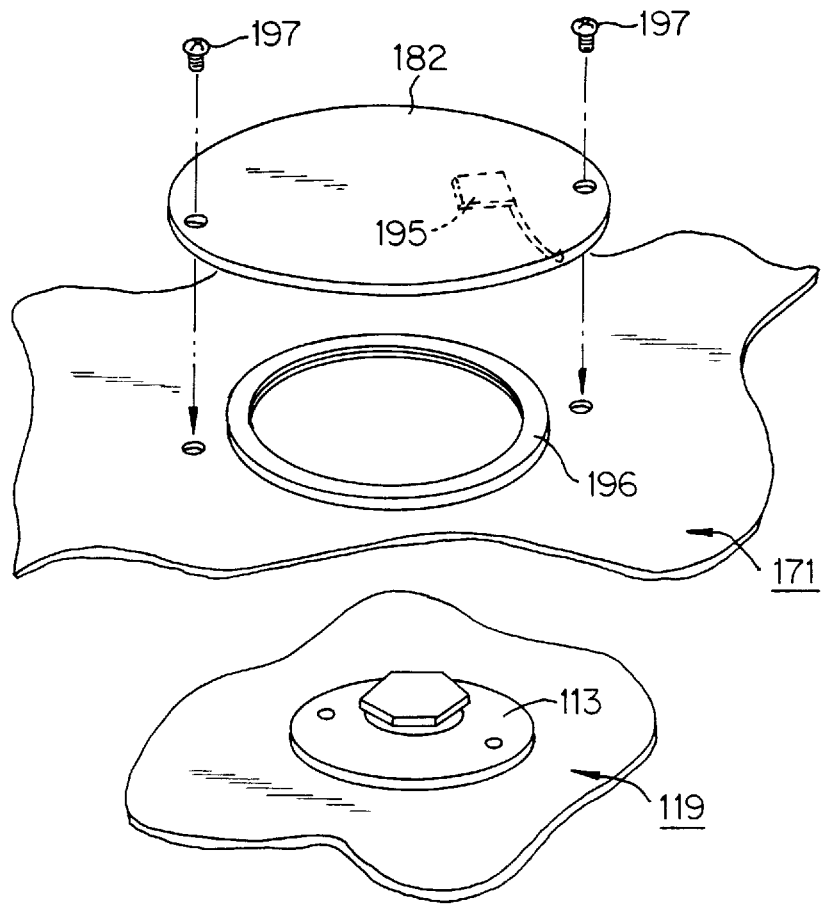
FIGS. 5(a) and (b) show a deflecting system and a corresponding cover of the first embodiment.
Figure 5B:
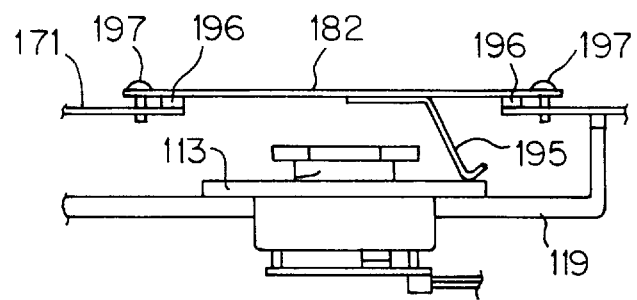

Next, setup of the deflecting system 113 and the cover 182 corresponding thereto will be explained in more concrete manner by referring to FIGS. 5(a), (b). In these drawings, 195 is a flat spring installed to the cover 182 and 196 is a sealing member bonded to the casing 171 of the image reading section I. As the cover 182 is assembled to the casing 171 of the image reading section I with screws as shown in the drawing, a flange part of the deflecting system 113 and the casing 171 of the image reading section I are connected together through the flat spring 195.

In the first embodiment, as explained above, the laser scanning device 101 is tightly enclosed by a part of the casing 171 of the image reading section I and at the same time access openings and covers in the casing 171 of the image reading section I are provided, which allow such service operations as removal and cleaning of parts within the laser scanning device 101 without rotating or moving the image reading section I. Also, reduction of the number of components and of the cost involved can be realized by such an arrangement. Also in the first embodiment, electric components within the laser scanning device 101 and the casing 171 of the image reading section I are connected together through the covers, such that radio frequency interference can be suppressed.

Figure 23:
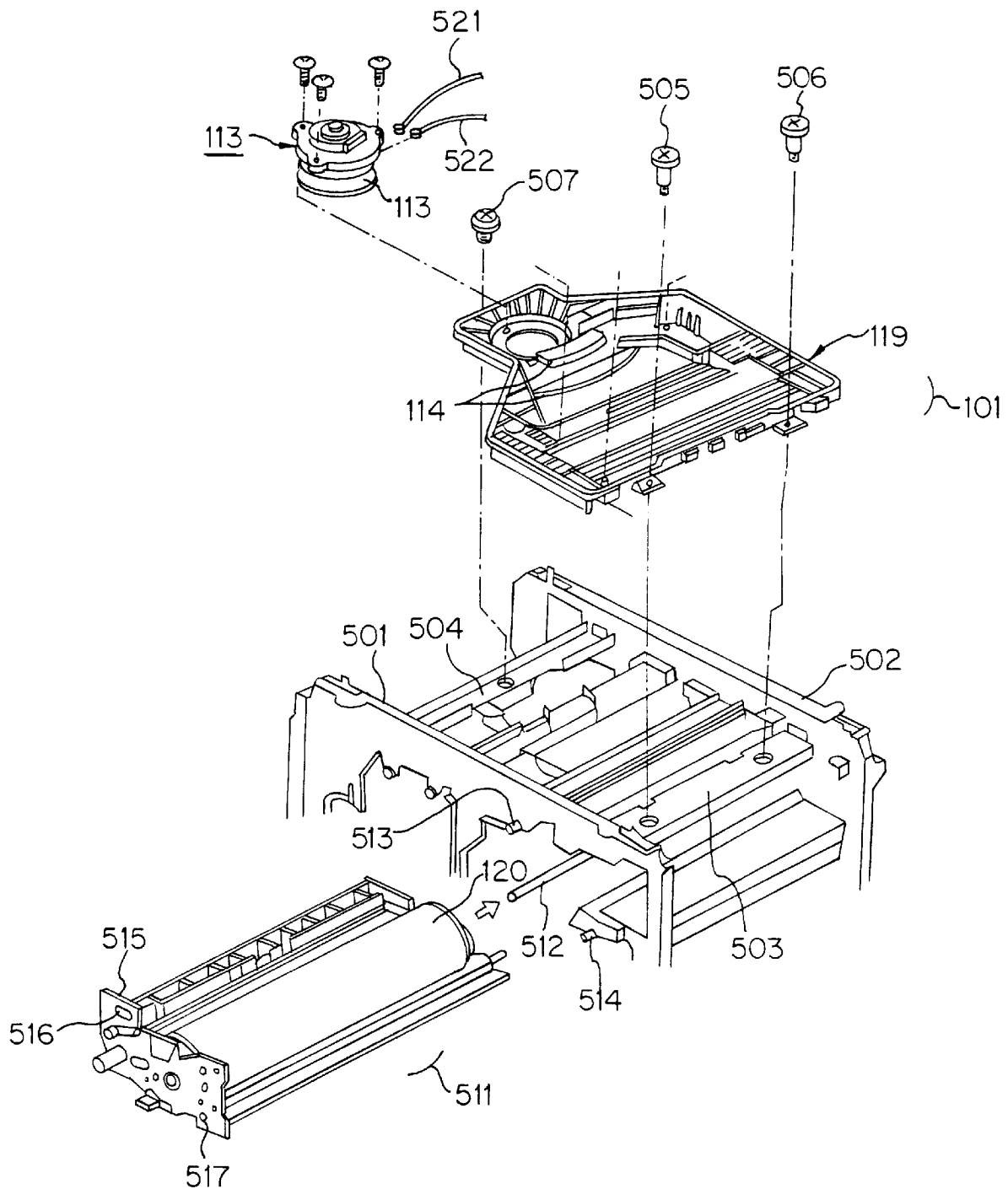
FIG. 23 shows a variation of the first embodiment wherein the casing is securely mounted to a main body (chassis) of the machine, accurately positioning the laser scanner relative to the drum.

FIG. 23 shows an example of a configuration in which laser scanner 101 and photosensitive drum 120 are provided on the main body or chassis of an image forming apparatus.

Referring to FIG. 23, casing 119 of the laser scanner mounting for a polygon-mirror unit 113, f lens 114, mirror or the like is fixed with three screws 505, 506, and 507 onto a right stay 503 and a left stay 504 provided on a front side plate 501 and a rear side plate 502 of the main body or chassis of the apparatus. Here, two of the three screws 505 and 506 are stepped. The laser scanner is accurately positioned relative to the right stay with a cylindrical portion of the screw, a hole in the box body, and a countersunk hole in the right stay. Incidentally, the right stay 503 is accurately positioned with holes provided in the front side plate 501, and the rear side plate 502.

Next, a photosensitive drum unit 511 mounting photosensitive drum 120 is positioned to the main body by the fitting of the drum driving shaft 512 which is positioned to the rear side plate 502 and the fitting of the pins 513 and 514 which are provided on the front side plate 501 with the holes 516 and 517 on the surface plate 515 of the photosensitive drum.

As described above, the relative positions of the laser scanner 101 and the photosensitive drum 120 are accurately determined by reference to the front and the rear side plates 501 and 502.

As further shown in FIG. 23, a harness 521 with a power source +24 V and a GND harness 521 and a harness 522 supplying a clock for determining an ON/OFF signal and a revolution number of the polygon-mirror unit are connected to the polygon-mirror unit 113 from the main body. The length of the harness 521 is set in advance in consideration of the replacement of the polygon-mirror unit. In other words, the length of the harness will be sufficient to enable the unit to be removed for inspection with the harness maintained attached.

Figure 24:
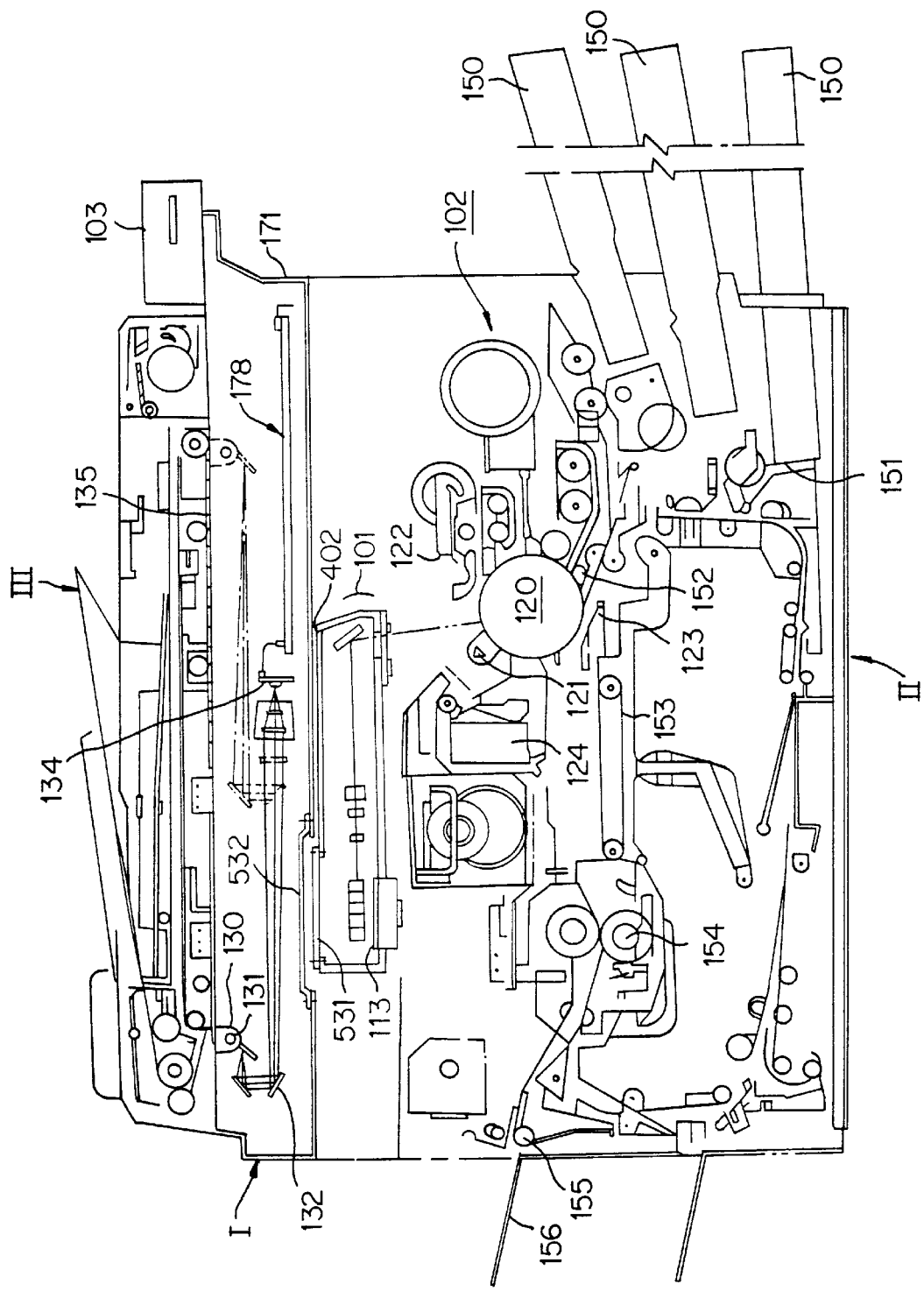
FIG. 24 shows electrical harnessing to the beam deflection unit.
Figure 25:
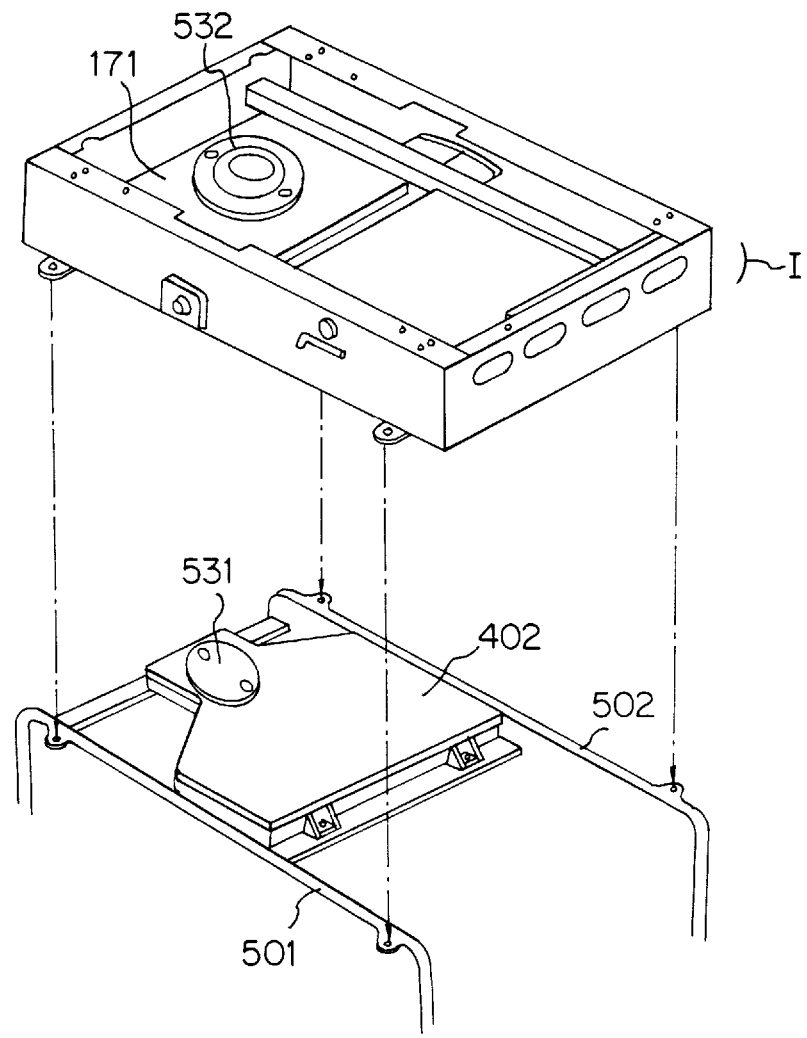
FIG. 25 depicts removal of the image reading section from the main body of the machine.
Figure 26:
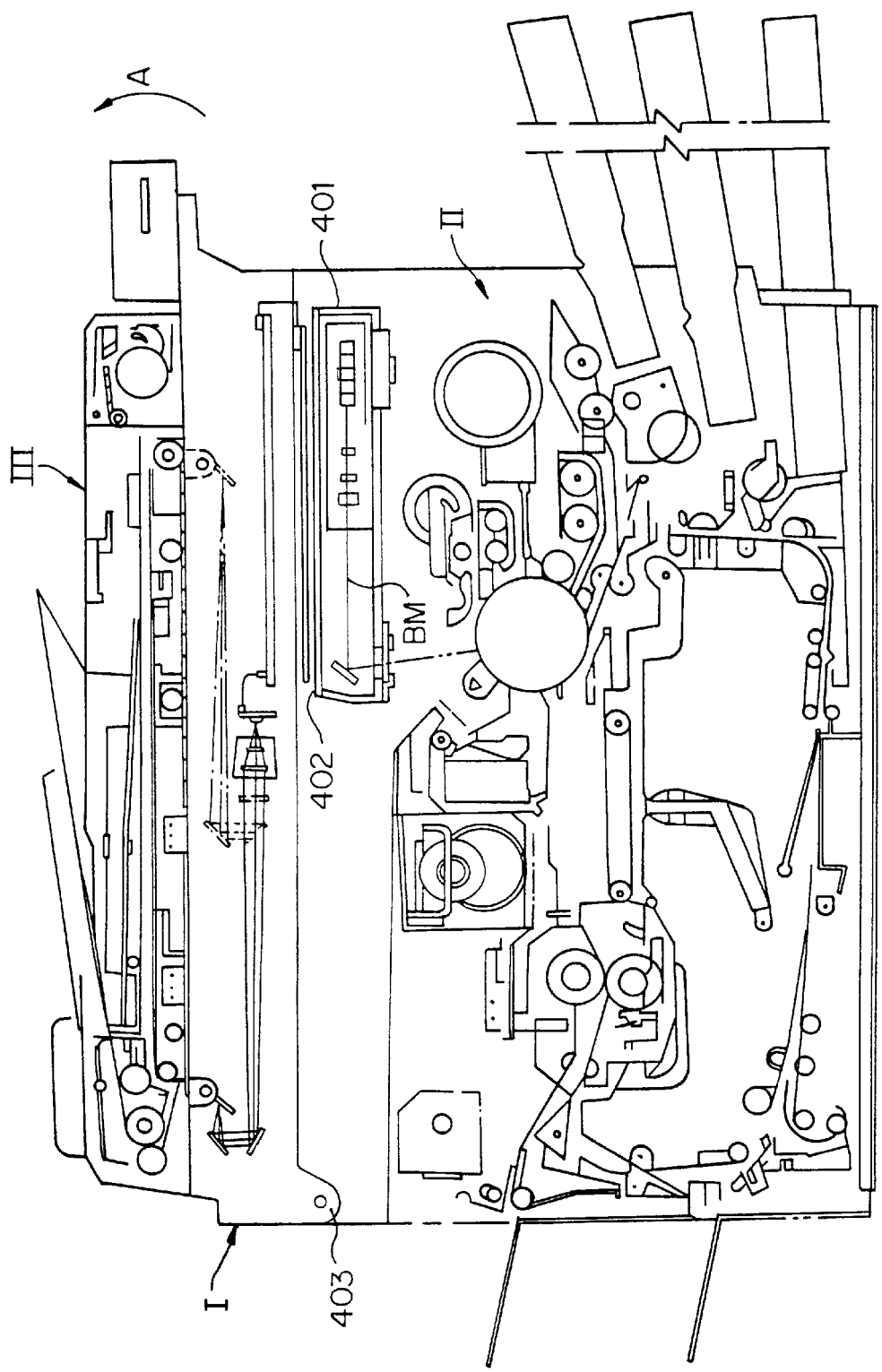
FIG. 26 shows an example of a conventional image forming section having image reading and laser scanning devices.
Figure 27:
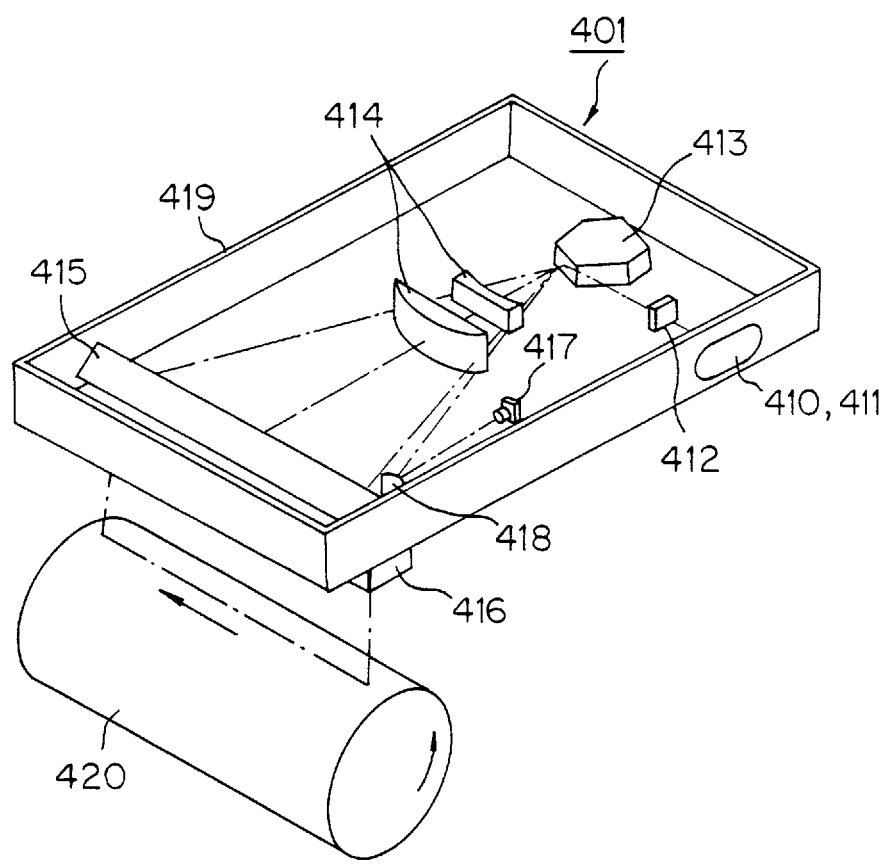
FIG. 27 shows the setup of a conventional laser scanning device.

A variation in which replacement of the polygon-mirror unit 113 is facilitated when an upper cover is provided on the laser scanner will be explained by using FIG. 24 and FIG. 25. FIG. 24 is a view in which an image forming apparatus is observed from the front side, and FIG. 25 is a perspective view showing a state in which an image reading section I is removed from a side plate of the main body. Here, an exclusive upper cover 402 is provided on the laser scanner. Then, an access opening is provided in a position corresponding to an upper part of the polygon-mirror unit 113 on the upper cover 502, and the opening is further covered with the cover 531. Further, an access opening is provided on the casing 171 of the image reading section I at a generally coaxial position corresponding to the upper part of the polygon-mirror unit 113, and the opening is covered with a cover 532. Then, when the polygon-mirror unit is replaced, a contact glass provided on the image reading apparatus is removed, and the polygon-mirror unit can be replaced by removing the covers 532 and 531.

Referring to FIGS. 6–12 of the drawings, a second embodiment of the invention is arranged such that each component element, e.g., the LD unit 109, the deflecting system 113, the f θ lens 114, etc. is fixed at a prescribed position by parts of the covers covering the openings of the casing 171 of the image reading section I or supporting members installed to the covers. Here, since the setup of the second embodiment is virtually the same as that of the first, only different portions will be explained.

Figure 6A:
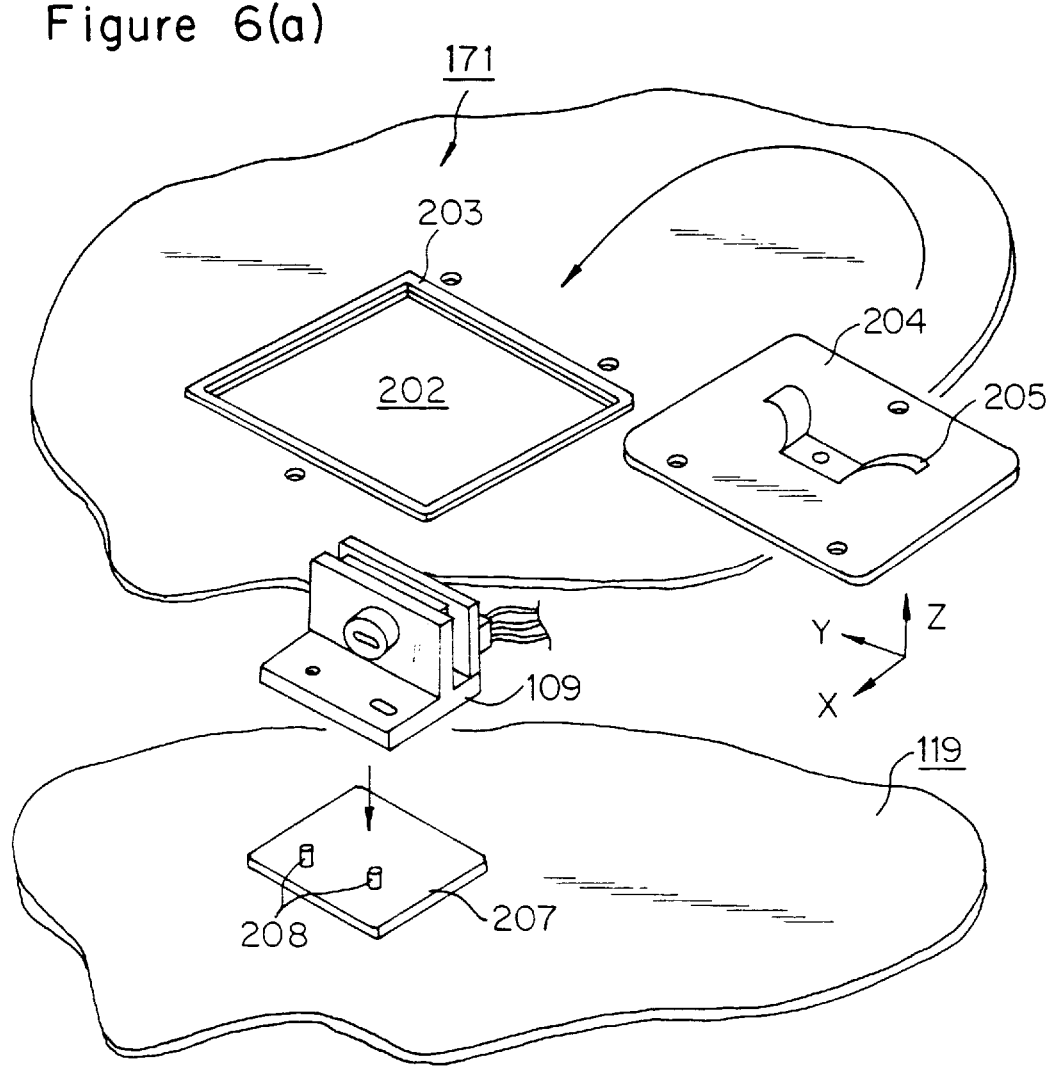
FIGS. 6(a) and (b) show an LD unit and a corresponding cover of the second embodiment.
Figure 6B:
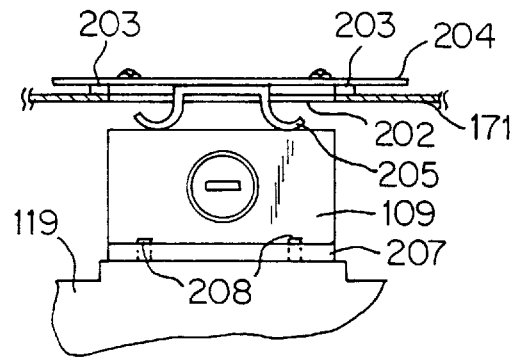

An arrangement of the LD unit 109 and the corresponding cover 204 will be explained by referring to FIGS. 6(a), (b). The LD unit 109 is replaced through an opening 202 provided in the casing 171 of the image reading section I. A sealing member 203 is provided in the vicinity of the opening 202 and close tightness within the laser scanning device 101 is secured by installing the cover 204. The LD unit 109 has its position in the XY directions determined by pins 208 provided on the casing 119 and has its position in the Z direction determined by a mounting plate 207. The LD unit 109 is fixed by a flat spring 205 provided in the cover 204 as the cover 204 is installed.

Figure 7A:
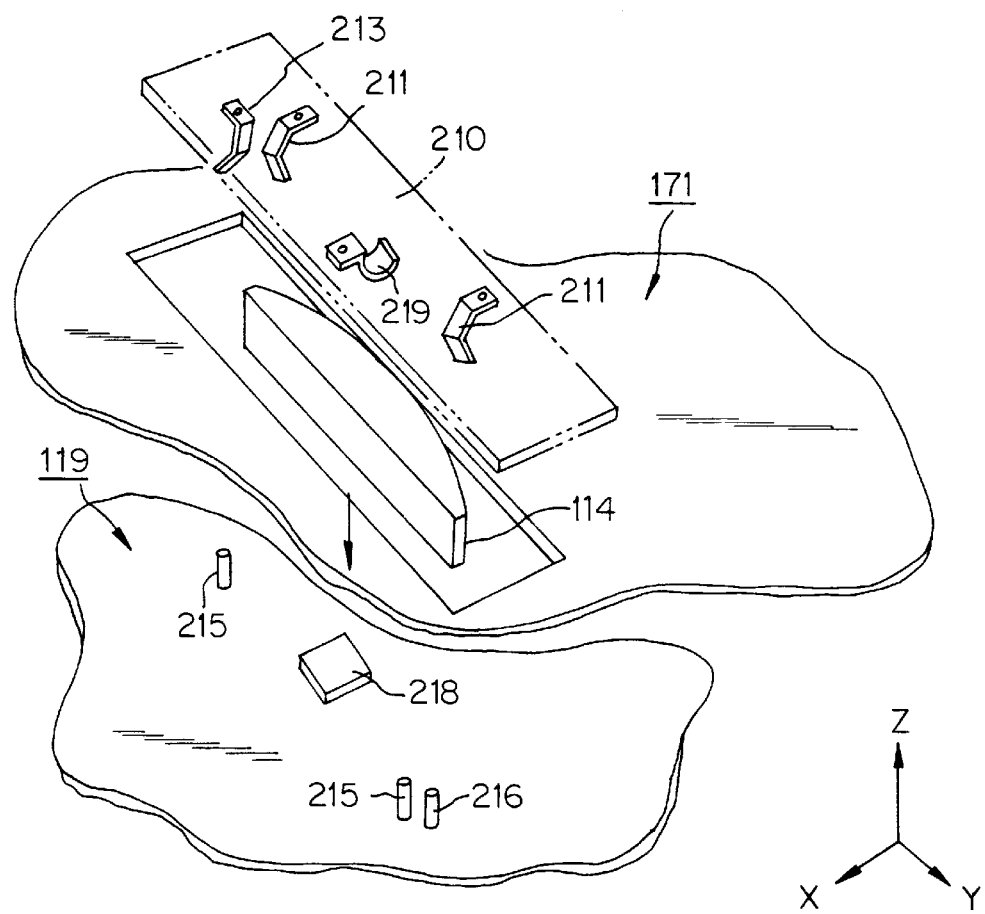
FIGS. 7(a)–(c) show an f θ lens and a corresponding cover of the second embodiment.
Figure 7B:
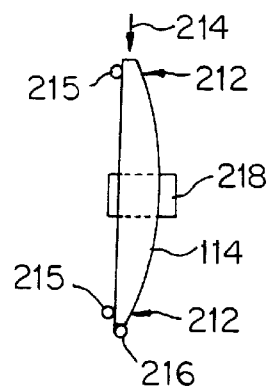
Figure 7C:
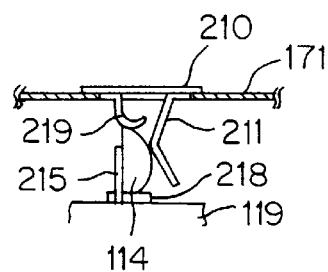

Setup of the f θ lens 114 and a cover 210 corresponding thereto will be explained by referring to FIGS. 7(a), (b), (c). The f θ lens 114 is replaced through an opening provided in the casing 171 of the image reading section I.

The f θ lens 114 is pushed in the directions respectively shown by the arrow marks 212, 214 by flat springs 211, 213 provided on the cover 210 by installing the cover 210, and are pushed against pins 215, 216 on the casing 119. Also, the lens 114 is pushed by a flat spring 219 against a mounting plate 218, and thus has its position in the Z direction determined.

Replacement of the f θ lens 114 can be made easily and positioning thereof can be made with a high level of precision solely by removal and attachment of the cover 210 as mentioned above.

Figure 8A:
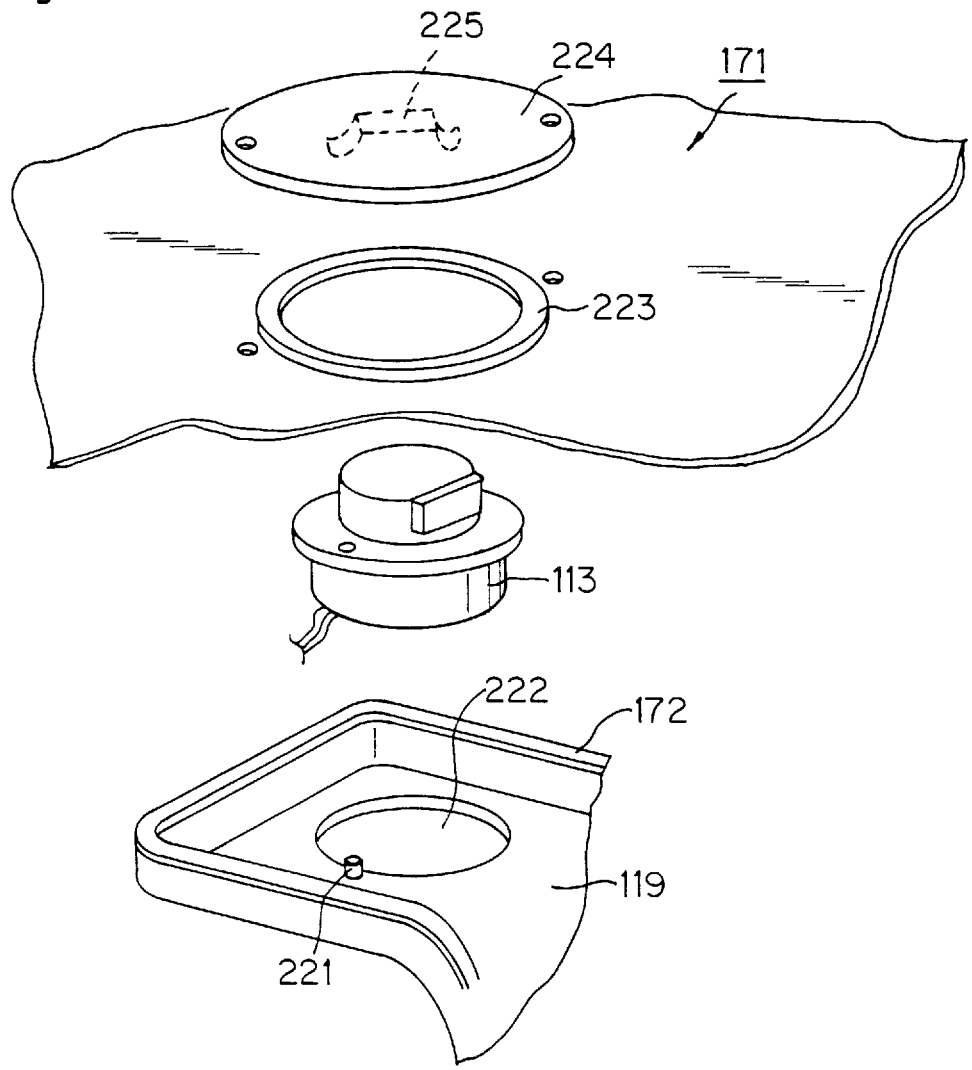
FIGS. 8(a) and (b) show a deflecting system and a corresponding cover of the second embodiment.
Figure 8B:
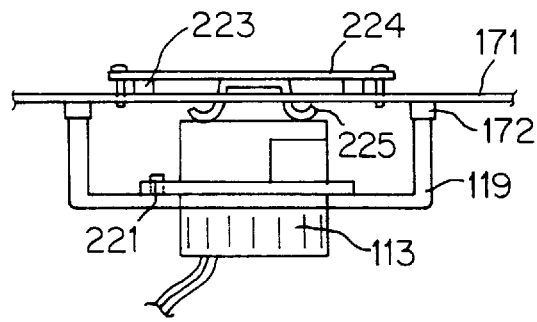

Setup of the deflecting system 113 and a cover 224 corresponding thereto will be explained by referring to FIGS. 8(a), (b). Replacement of the deflecting system 113 can be made through an opening provided in the casing 171 of the image reading section I, and the deflecting system 113, inserted into an insertion hole 222 provided in the casing 119, has its rotating direction determined by a pin 221. The deflecting system 113 is pushed by a flat spring 225 installed on the cover 224 onto the casing 119. Tight closure between the cover 224 and the casing 171 is secured by a sealing member 223, and at the same time tight closure between the casing 119 and the casing 171 is secured by a sealing member 172.

Figure 9:
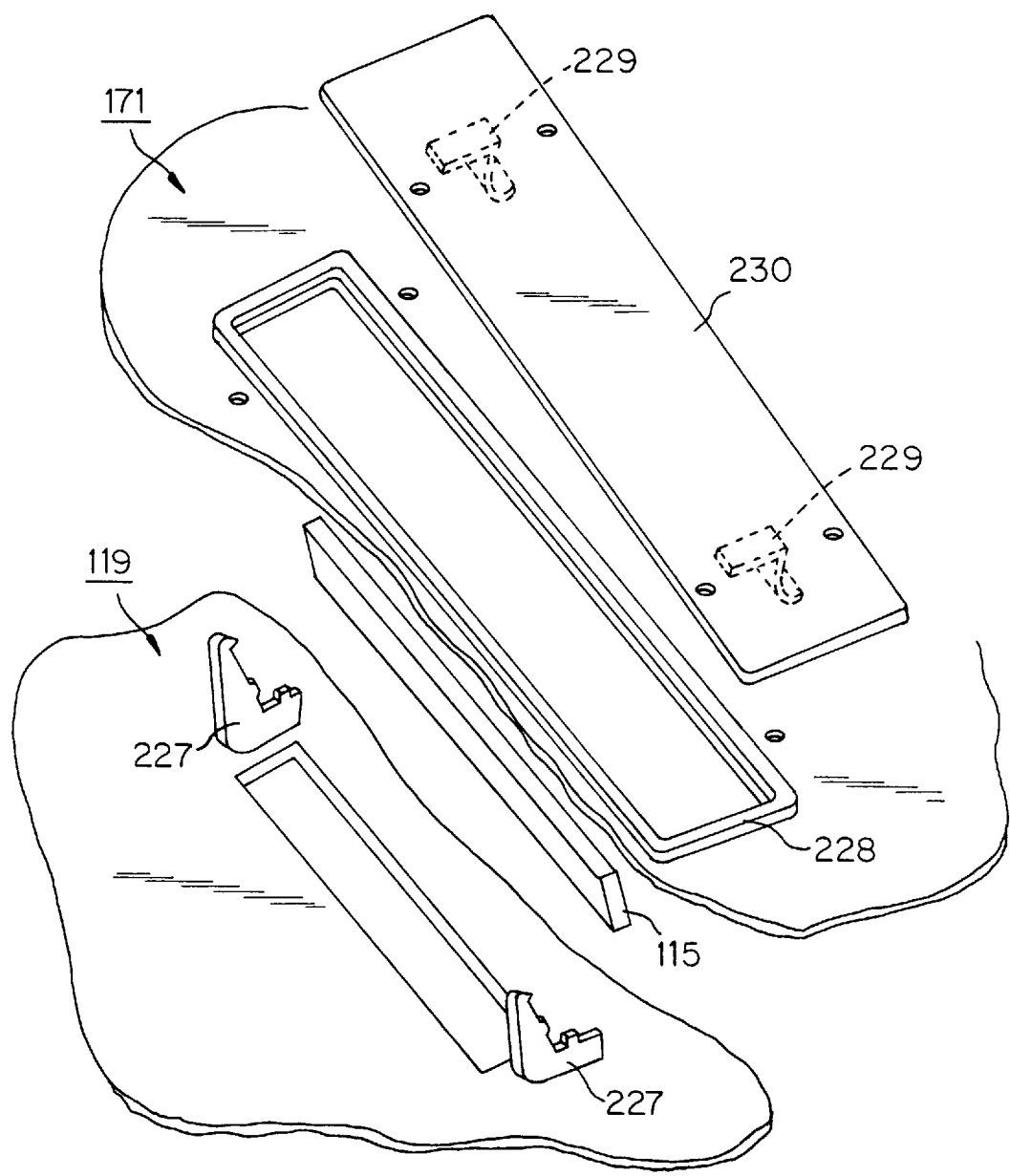
FIG. 9 is an exploded view of a mirror and a corresponding cover of the second embodiment.
Figure 10A:
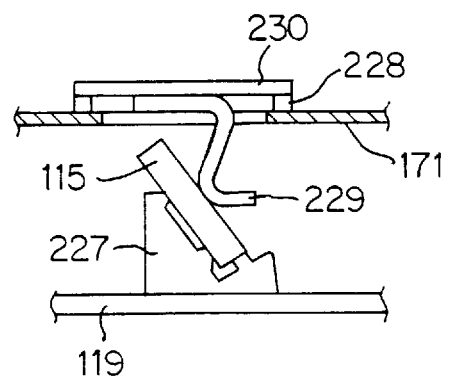
FIGS. 10(a) and (b) depict details of the mirror and corresponding cover of the second embodiment.

Next, setup of the mirror 115 and a corresponding cover 230 will be explained by referring to FIGS. 9 and 10(a), (b). The mirror 115 can be replaced through an opening provided in the casing 171 of the image reading section I, and the mirror 115 is pushed against an angle defining member 227 on the casing 119 by a flat spring 229 provided on the cover 230, thus having its position determined and fixed by installing the cover 230.

Figure 10B:
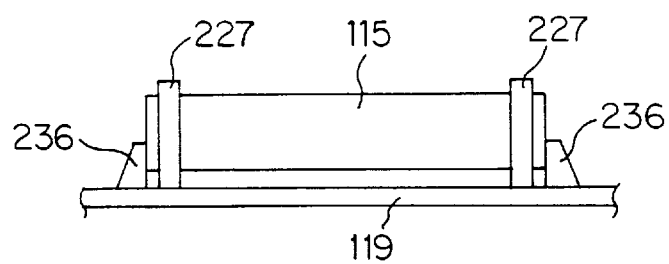

The longitudinal direction of the mirror 115 is defined by a defining member 236 shown in FIG. 10(b). Also, tight closure between the cover 230 and the casing 171 is secured by a sealing member 228.

Figure 11:
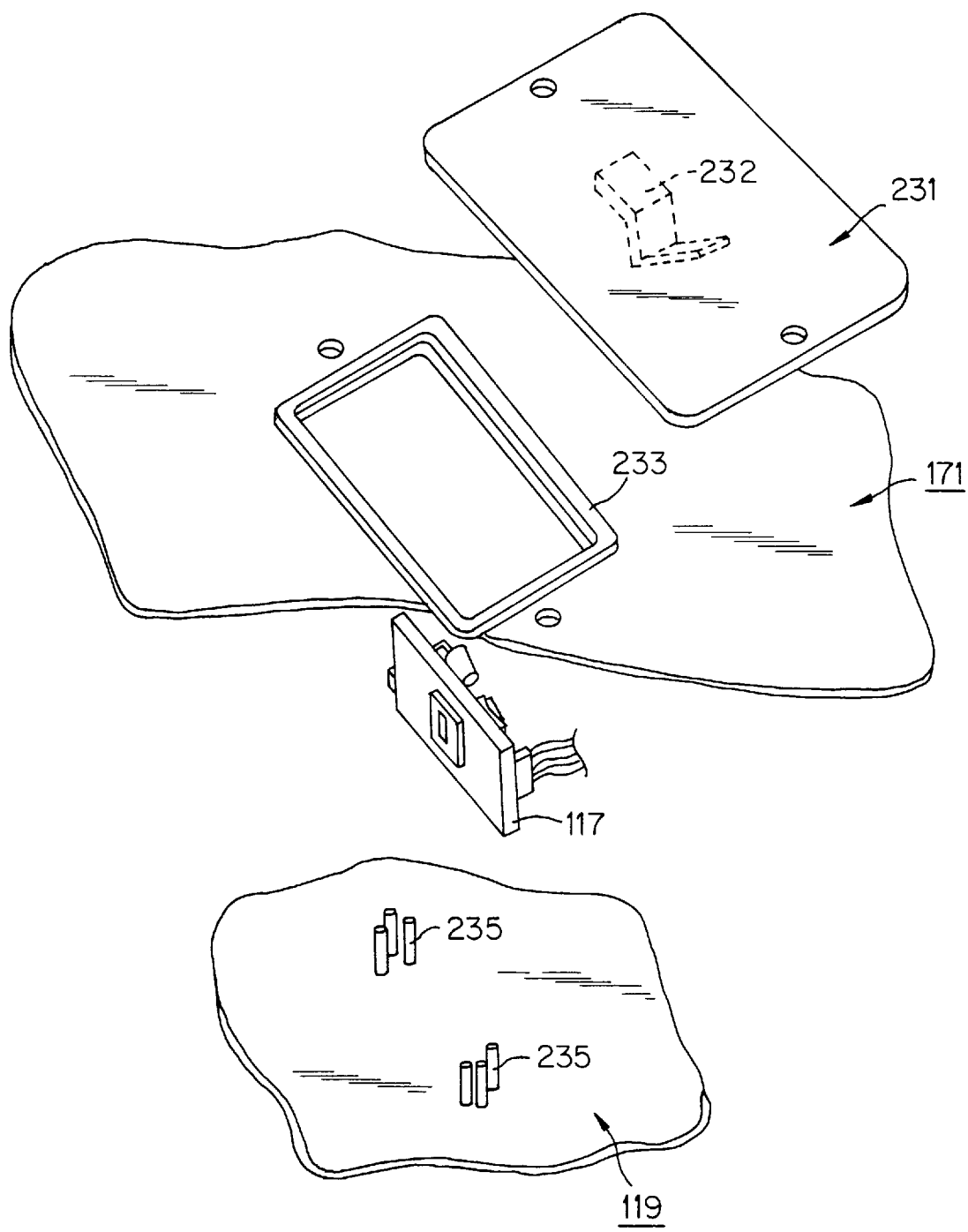
FIG. 11 is an exploded view to show a photo sensor and a corresponding cover of the second embodiment.
Figure 12A:
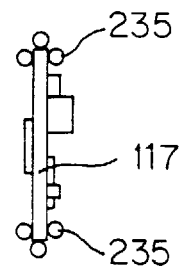
FIGS. 12(a) and (b) show more detail of the photo sensor and a corresponding cover of the second embodiment.
Figure 12B:
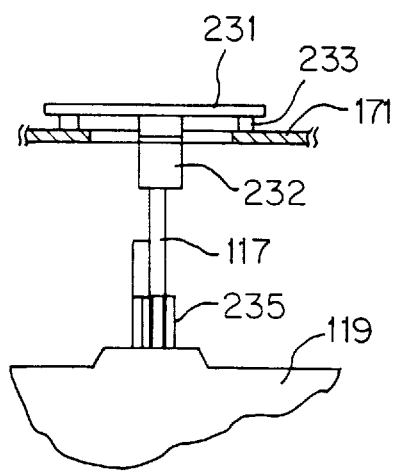

Next, setup of the photo sensor 117 and a corresponding cover 231 will be explained by referring to FIGS. 11 and 12(a) and (b). The photo sensor 117 can be replaced through an opening provided in the casing 171 of the image reading section I, and has its position determined by a pin member 235 on the casing 119, being pushed by a flat spring 232 provided on the cover 231 and fixed. Also, tight closure between the cover 231 and the casing 171 is secured by a sealing member 233.

As has been explained above, in the second embodiment, each component element such as the LD unit 109, the deflecting system 113, the f θ lens 114, etc. is fixed at a prescribed position by parts of the covers covering the openings or the supporting members installed at the covers and provided on the casing 119. Therefore, replacement of components within the laser scanning device 101 can be made easily and simply, in addition to similar effects as in the first embodiment.

A third embodiment of the invention has such an arrangement that a switc which is turned ON/OFF in association with attaching and removal of a cover is provided for prohibiting the driving of each component element such as the LD unit 109, the deflecting system 113, the f θ lens 114, etc. when the cover is removed. Here, since the arrangement of the third embodiment is almost same as that of the first, only different portions will be explained.

Figure 13A:
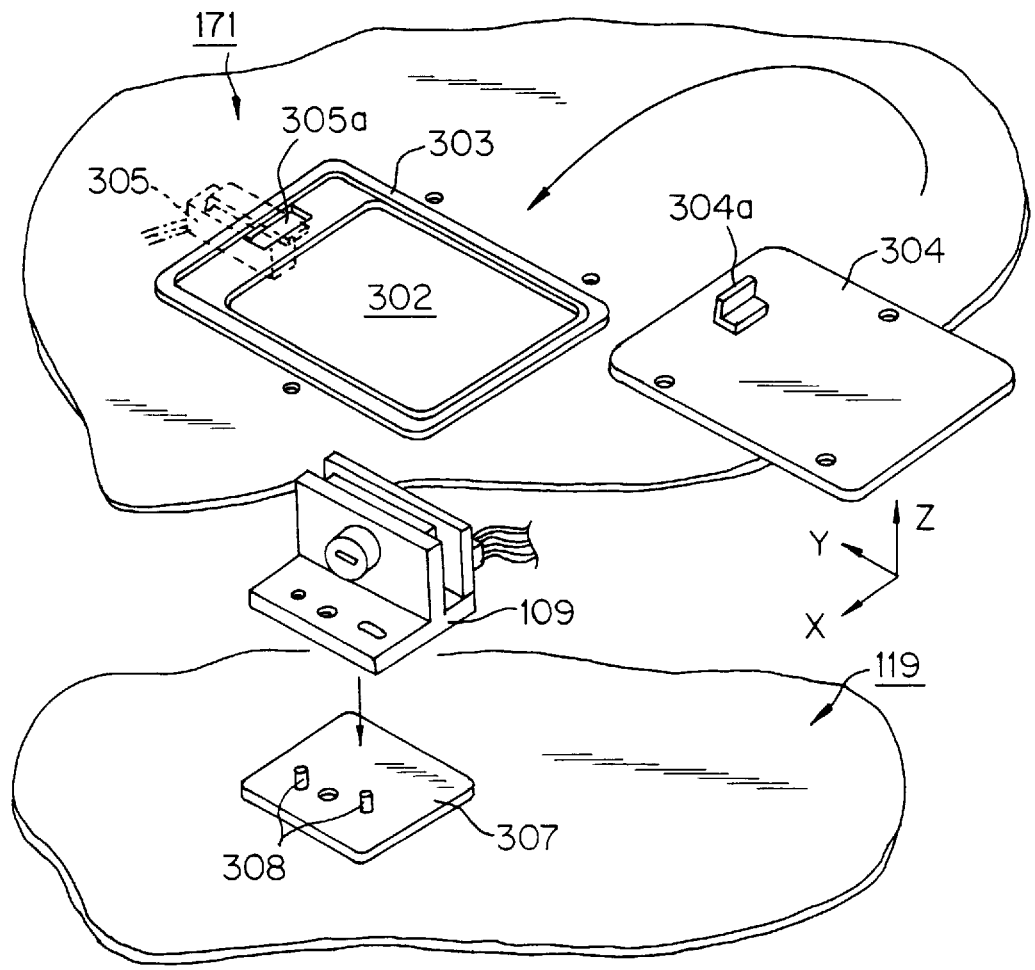
FIGS. 13(a) and (b) show an LD unit and a corresponding switch of a third embodiment.
Figure 13B:
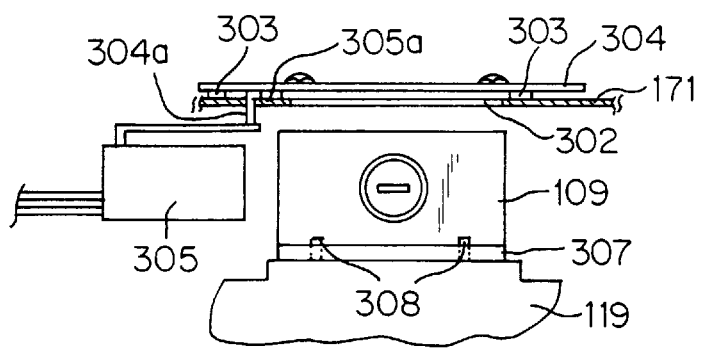

Setup of the LD unit 109 and a switch 305 corresponding thereto will be explained by referring to FIGS. 13(a), (b). The LD unit 109 can be replaced through an opening 302 provided in the casing 171 of the image reading section I. The LD unit 109 has its position in the XY directions determined by a pin 308 provided on the casing 119, and has its position in the Z direction determined and fixed by a mounting stand 307. A projection 304a for pushing a switch 305 is provided in a cover 304, and when the cover 304 is installed, this projection 304a is inserted into an opening 305a for pushing down the switch 305, and pushes an actuator of the switch 305. Here, the position at which the switch 305 is installed may be at the casing 171 side of the image reading section I or the casing 119 side of the laser scanning device 101, or any other part, and is not specifically limited. However, it is vital that the actuator is surely pushed down by the projection 304a inserted into the above mentioned opening 305a.

A sealing member 303 is placed around the opening 302 and tight closure within the laser scanning device 101 is secured by attaching the cover 304. Further, as the opening 305a into which the projection 304a for pushing down the switch 305 is inserted is provided at the inside of the sealing member 303, tight closure at this portion is secured.

Figure 14:
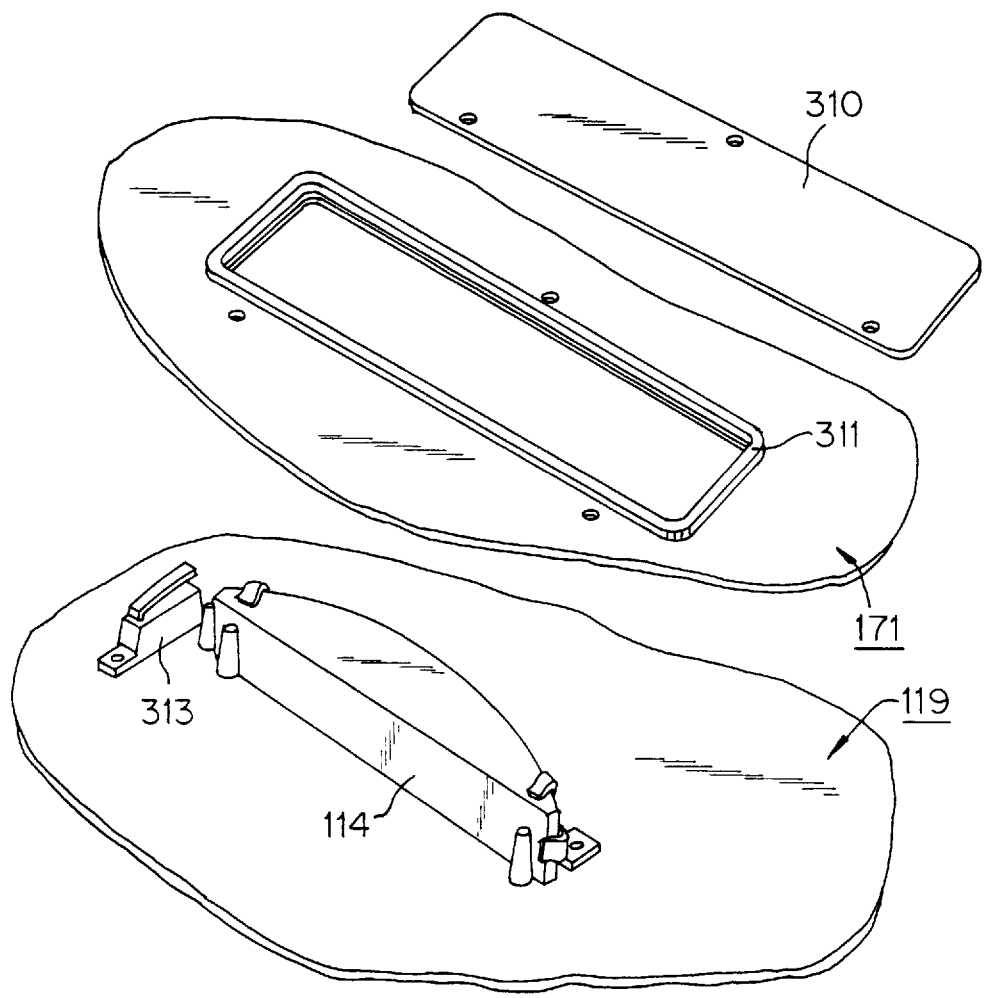
FIG. 14 shows an f θ lens and corresponding switch of the third embodiment.
Figure 15:
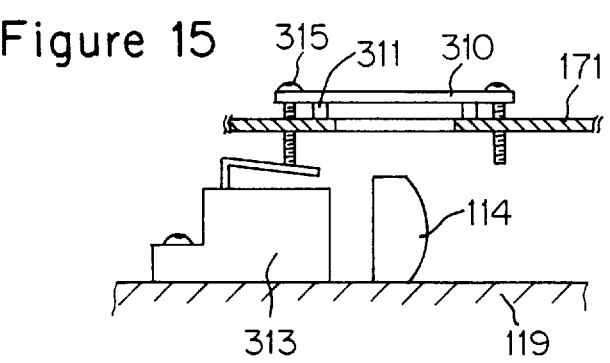
FIG. 15 shows in more detail the f θ lens and corresponding switch of the third embodiment.

Setup of the f θ lens 114 and a switch 313 corresponding thereto will now be explained by referring to FIGS. 14 and 15. The f θ lens 114 is replaced through an opening provided in the casing 171 of the image reading section I. A cover 310 is installed on an opening provided in the casing 171 for replacing the f θ lens 114, and by tightening a screw 315 a tip of the screw 315 pushes down an actuator of the switch 313 thus actuating the switch 313. Tight closure within the casing 119 when the cover 310 is installed is secured by a sealing member 311.

Figure 16A:
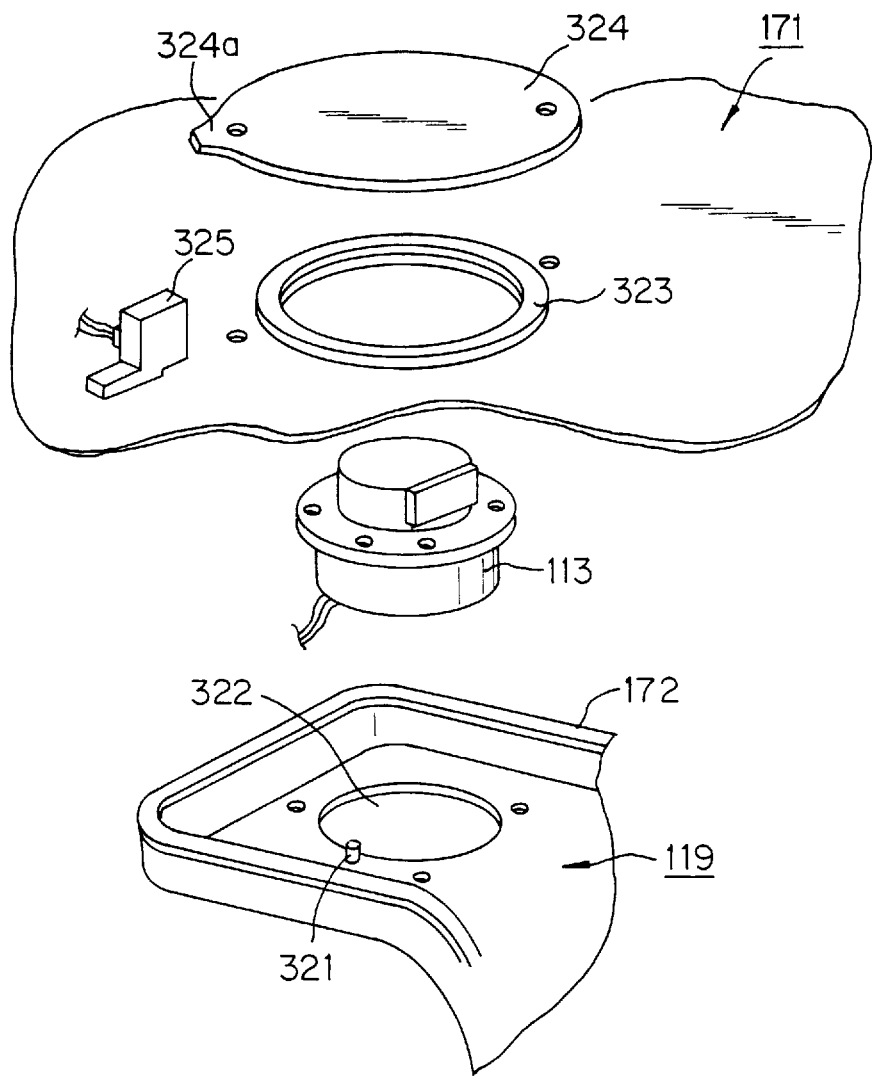
FIGS. 16(a) and (b) show details of a deflecting system and a corresponding switch of the third embodiment.
Figure 16B:
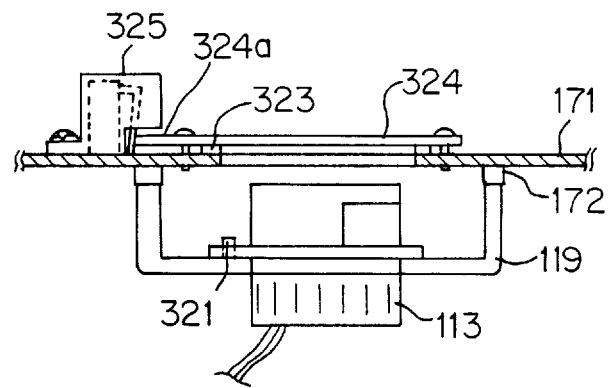

Setup of the deflecting system 113 and a switch 325 corresponding thereto will next be explained by referring to FIGS. 16(a), (b). Replacement of the deflecting system 113 is possible through an opening provided in the casing 171 of the image reading section I, and the deflecting system 113 is inserted into an insertion hole 322 provided in the casing 119 and has its direction of rotation determined by a pin 321. A projection 324a is provided in a cover 324, and when the cover 324 is installed this projection 324a enters into the switch 325 for operating an actuator. Tight closure between the cover 324 and the casing 171 is secured by a sealing member 323, and at the same time tight closure between the casing 119 and the casing 171 is secured by a sealing member 172.

Figure 17A:
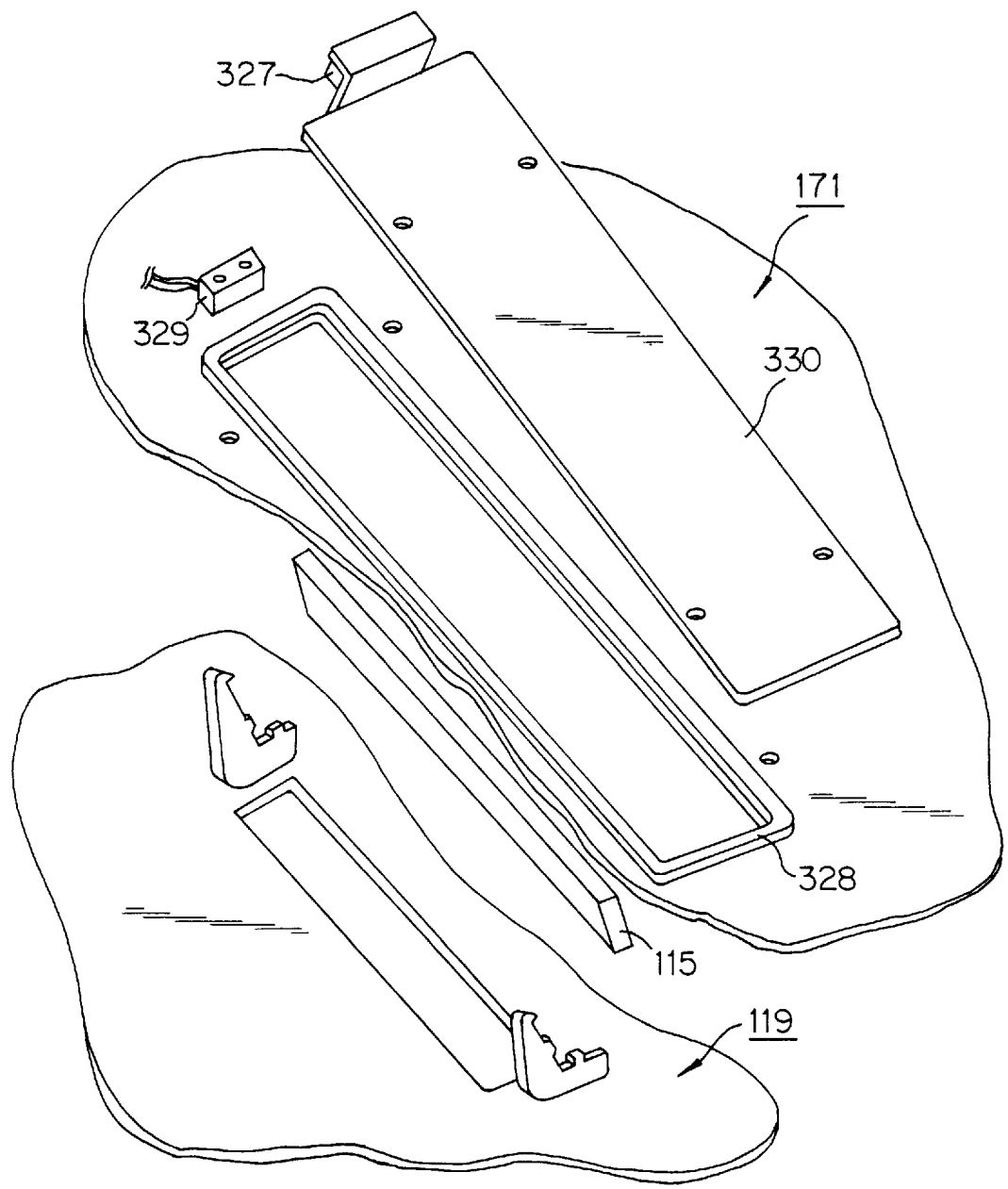
FIGS. 17(a) and (b), and FIGS. 18(a) and (b), show a mirror and a corresponding switch of the third embodiment.
Figure 17B:
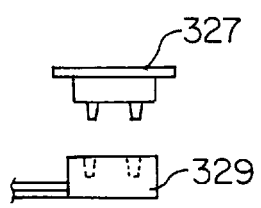

Setup of the mirror 115 and switches 327, 329 corresponding thereto will now be explained by referring to FIGS. 17(a) and (b), and 18(a) and (b). The mirror 115 can be replaced through an opening provided in the casing 171 of the image reading section I, and as a cover 330 is installed, a male side 327 of a plug-in switch in the cover 330 enters into a female side 329 on the casing 171, thus activating the switches.

Figure 18A:
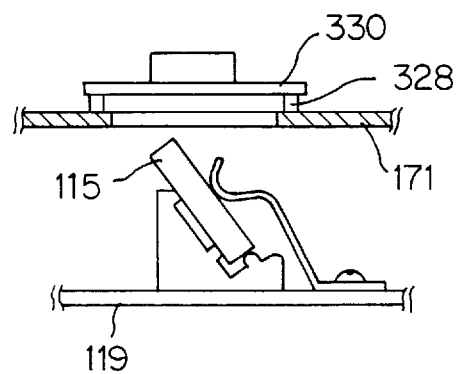
Figure 18B:
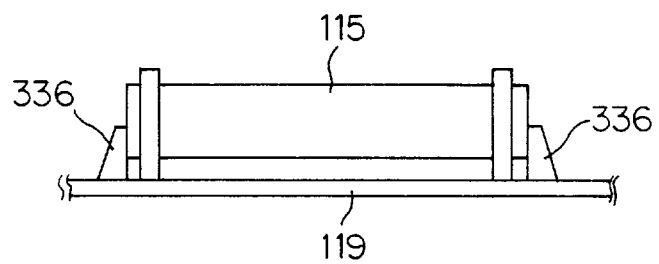

The lengthwise direction of the mirror 115 is defined by a defining member 336 shown in FIG. 18(b). Also, tight closure between the cover 330 and the casing 171 is secured by a sealing member 328.

Figure 19A:
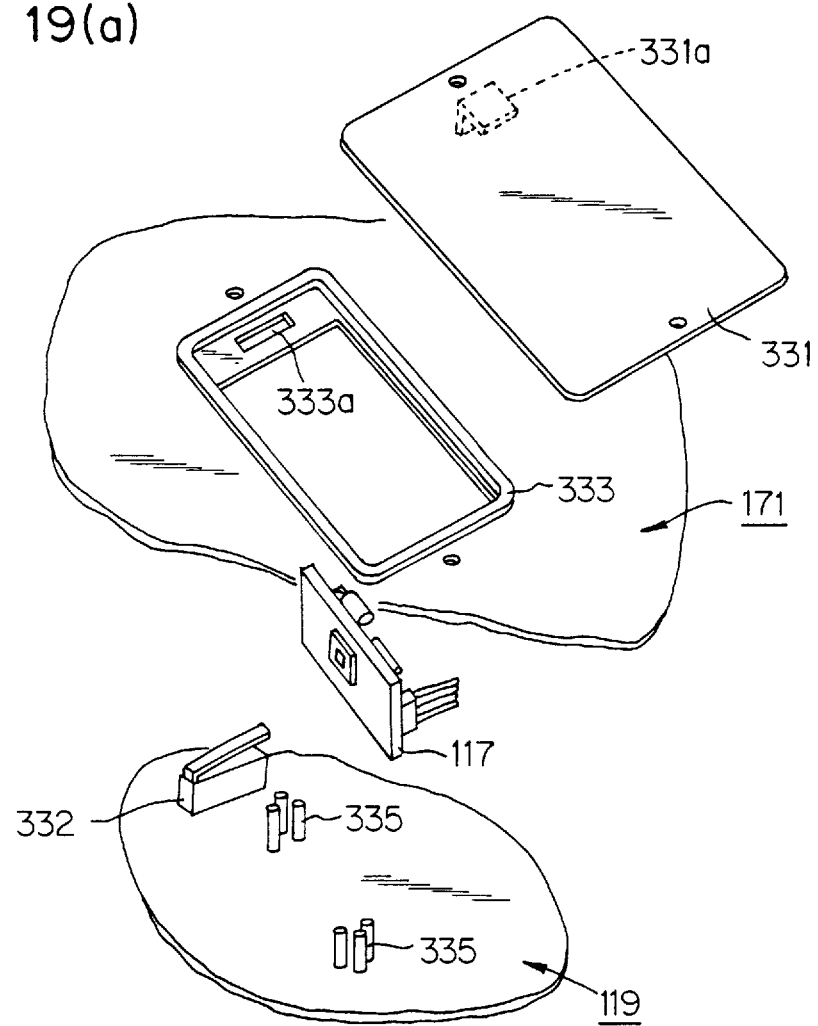
FIGS. 19(a) and (b) show a photo sensor and a corresponding switch of the third embodiment.
Figure 19B:
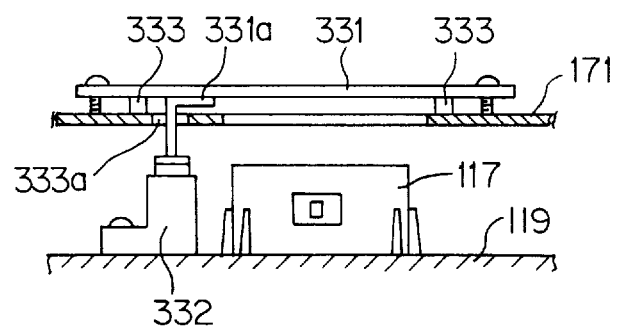

Next, setup of the photo sensor 117 and a switch 332 corresponding thereto will be explained by referring to FIGS. 19(a) and (b). The photo sensor 117 can be replaced through an opening provided in the casing 171 of the image reading section I, and has the photosensor position determined by a pin member 335 on the casing 119. Also, as a cover 331 is installed a projection 331a provided on the cover 331 is inserted into an opening 333a and pushes an actuator of a switch 332. Also, tight closure between the cover 331 and the casing 171 is secured by a sealing member 333.

Figure 20A:
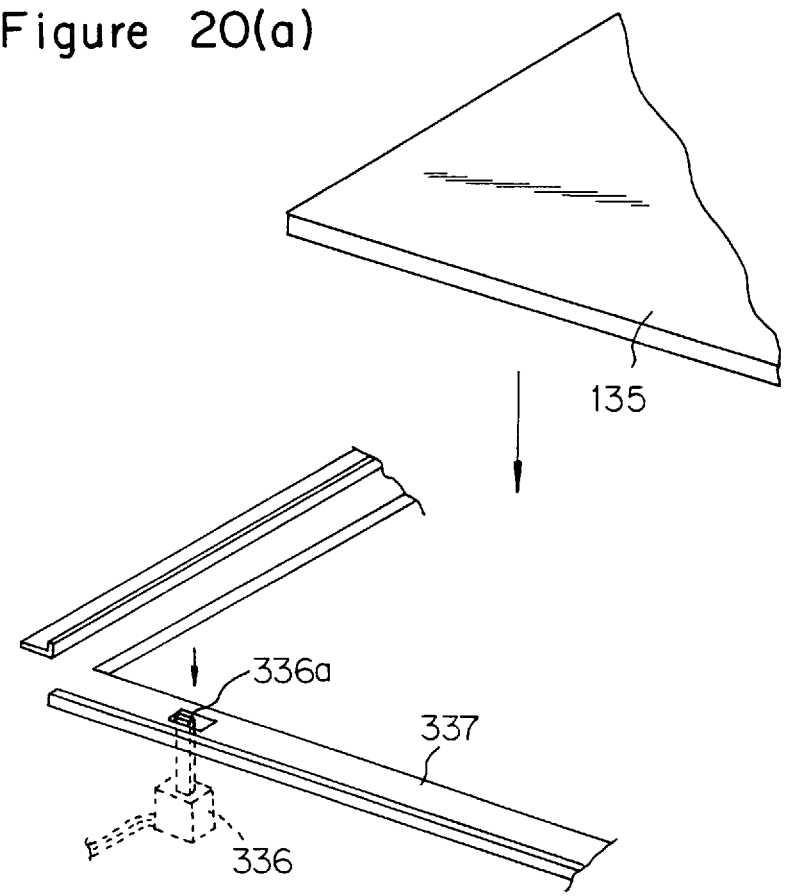
FIGS. 20(a) and (b) show an example in which a switch is operated in association with an installation of a contact glass.
Figure 20B:
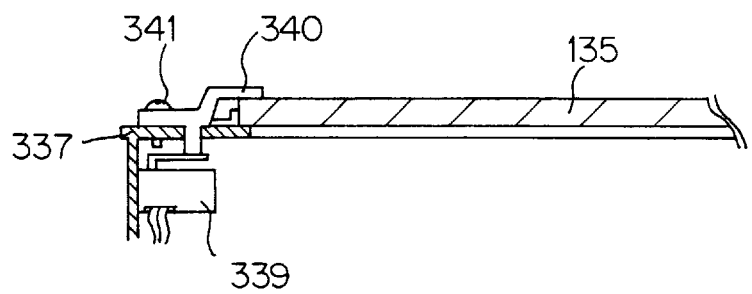

An example where a switch is operated in association with an installation of the contact glass 135 will be shown by referring to FIGS. 20(a) and (b). FIG. 20(a) shows the manner in which an actuator 336a of a switch 336 is pushed down as the contact glass 135 is installed at an installation plane 337. Also, FIG. 20(b) shows a manner in which a switch 339 is operated by a part of a tightening member 340 for the contact glass 135 as the tightening member 340 is installed, as another arrangement example. Further in this case, a setup such that the switch 339 is operated by tightening a screw 341 for retaining the tightening member 340 may be employed.

A method to operate each one of the switches mentioned above (305, 313, 325, 329, 332, 336, 339) may be selected as desired, and an appropriate one may be provided at an appropriate position in view of layout and cost involved. Also, a position at which each switch is installed may be freely selected.

Figure 21:
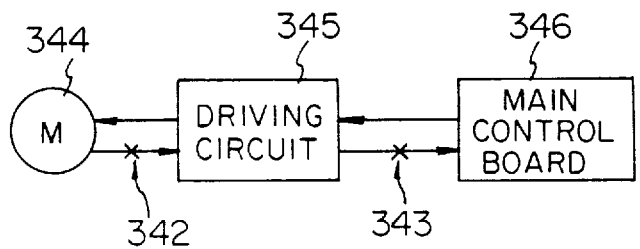
FIG. 21 is a schematic diagram to show positioning and operations of switches in the third embodiment.

Such an arrangement employed for operation of each switch is provided, as shown in FIG. 21, at a position 342 between a driving part 344 for the reading motor, the LD unit, the deflecting system, the illumination lamp, etc. and a driving circuit 345 therefor, or at a position 343 between the driving circuit 345 and a main control board 346, such that driving part 344 will not function when a cover, contact glass, etc. is removed in both cases. Also, each switch may be placed at a power source system or at a signal system.

In the third embodiment, as described above, a switch for detecting a removal of a cover is provided so that an operation of a scanner (reading motor), light emission of a light source (LD unit 109), rotation of the deflecting system 113, etc. is prohibited when the cover is removed, thus securing the safety of an operator, in addition to similar effects as in the first embodiment.

Figure 22:
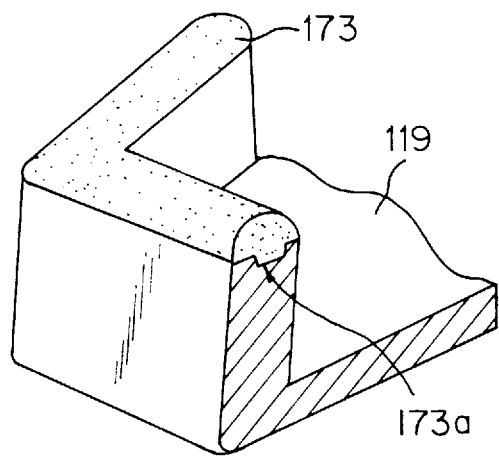
FIG. 22 shows another example of installing a sealing member on an upper plane of the casing of a laser scanning device.

Also, while the above mentioned first embodiment shows an example in which the sealing member 172 is bonded with a double coated pressure sensitive adhesion tape for installing the sealing member on an upper plane of the casing 119 of the laser scanning device 101, such an arrangement may be employed that a groove part 173a is provided at the upper plane of the casing 119, as shown in FIG. 22, and a sealing member 173 is poured into and foamed in that groove part 173a. While there is a possibility that a gap may be created at a matched part between the sealing members 172a–172d in the method shown in FIG. 2, no gap will be generated in the method of FIG. 22 and thus tight closure can be enhanced. Also, a process to pour and foam the sealing member 173 can be easily automated (robot operation) and thus the operating efficiency can be improved.

As has been explained above, an image forming device according to the present invention has openings provided in a casing comprising an image reading means at positions opposing at least a light source, a deflecting system, or a lens group of an exposure means and further has cover members for covering these openings provided, therefore, the light source, the deflecting system, or the lens group placed underneath the openings can be replaced by removing the cover and thus exposing the openings. In other words, servicing such as replacement and cleaning operations for components within the laser scanning device can be made without rotating or moving the image reading device, and thus the cost of the device can be reduced.

We claim:

1. An image forming device having an image reading section at least partially housed by a first casing for reading image information from an original and an exposure section housed by a second casing beneath the first casing for exposing a photosensitive body with the image information from said image reading section, said exposure section comprising at least a light source, a deflecting system to deflect a beam produced by said light source and optics to image the beam scanned by said deflecting system on said photosensitive body, wherein at least one of said light source, deflecting system and optics is a serviceable component, and at least one access opening is provided between the interiors of said first and second casings in a position opposing the at least one serviceable component within said second casing, and including at least one cover member for covering the at least one access opening.

2. The image forming device of claim 1, wherein said first and second casings share a common wall therebetween within which said at least one access opening is formed.

3. The image forming device of claim 2, including a seal between said first and second casings.

4. The image forming device of claim 3, wherein said seal is formed along and in a grooved portion of said second casing.

5. The image forming device of claim 1, wherein said second casing is displaced from said first casing, and generally coaxial openings formed in facing walls of said casings are enclosed by cover members.

6. The image forming device of claim 1, wherein said serviceable component in said second casing is fixed at a prescribed position by a part of one of said cover members or by a support member attached to the cover member.

7. The image forming device of claim 1, including a wiring harness connected to at least one of said serviceable units, said wire harness having a length sufficient to enable the serviceable unit to be removed through its corresponding access opening while the harness remains connected.

8. The image forming device of claim 1, wherein said second casing and said photosensitive body are mounted to a common chassis.

9. An image forming device having an image reading section at least partially housed by a first casing for reading image information from an original and an exposure section housed by a second casing beneath the first casing for exposing a photosensitive body with the image information from said image reading section, said exposure section comprising at least a light source, a deflecting system to deflect a beam produced by said light source and optics to image the beam scanned by said deflecting system on said photosensitive body, wherein at least one of said light source, deflecting system and optics is a serviceable component, and at least one access opening is provided between the interiors of said first and second casings in a position opposing the at least one serviceable component within said second casing, and including at least one cover member for covering the at least one access opening and including switches which are turned ON/OFF in association with the attaching and removing of said cover members.

10. The image forming device of claim 9, wherein said switches control a circuit for prohibiting at least the driving of said image reading section by opening of said cover members.

11. The image forming device of claim 9, wherein said switches control a circuit for prohibiting at least light emission by said light source by opening of said cover members.

12. The image forming device of claim 9, wherein said switches control a circuit prohibiting at least the driving of said deflection system by opening of said cover members.

13. The image forming device of claim 12, wherein said second casing encloses a laser scanner and said photosensitive body comprises a rotatable drum, wherein said common chassis maintains said scanner and drum in registration with each other.

14. An image forming device having image reading means to read image information from an original placed on a contact glass and exposure means to effect an exposure over a photosensitive body with the image information from said image reading means, said exposure means comprising at least a light source, a deflecting system to deflect a beam from said light source, a lens group to image the beam scanned by said deflecting system on said photosensitive body, and an exposure casing having an open part which houses said light source, deflecting system and lens group, and said exposure casing being tightly closed by a closing member, said exposure casing including a bottom portion and a side surface portion, said light source, said deflecting system and said lens group being arranged on said bottom portion of said exposure casing, wherein at least one access opening is provided in said exposure casing at such a position to oppose one of at least the light source, the deflecting system and the lens group of said exposure means, and including at least one cover member for covering a corresponding said access opening.

15. The image forming device of claim 14, further comprising a mirror and a beam detecting means located within said exposure casing and wherein access openings are provided in said casing at such positions as opposing at least the mirror or the beam detecting means of said exposure means.

16. The image forming device of claim 15, further comprising switches which are turned ON/OFF in association with the attaching and removing of said cover members.

17. An image forming device according to claim 16, wherein said switches are provided in such a manner as prohibiting at least the driving of said image reading means by opening of said cover members.

18. An image forming device according to claim 16, wherein said switches are provided in such a manner as prohibiting at least light emission by said light source by opening of said cover members.

19. An image forming device according to claim 16, wherein said switches are provided in such a manner as prohibiting at least the driving of said deflecting system by opening said cover members.

20. The image forming device of claim 14 wherein said light source, deflecting system or lens group are fixed at prescribed positions by a part of said cover members or by support members attached to the cover members.

21. The image forming device of claim 14 further comprising switches which are turned ON/OFF in association with the attaching and removing of said cover members.

22. An image forming device according to claim 21, wherein said switches are provided in such a manner as prohibiting at least the driving of said image reading means by opening of said cover members.

23. An image forming device according to claim 21, wherein said switches are provided in such a manner as prohibiting at least light emission by said light source by opening of said cover members.

24. An image forming device according to claim 21, wherein said switches are provided in such a manner as prohibiting at least the driving of said deflecting system by opening of said cover members.

25. The image forming device of claim 14, wherein said closing member is a contact glass, said at least one access opening can be accessed by the removal of said contact glass.

26. The image forming device of claim 25, further comprising a sensor for detecting whether the contact glass is installed and a controller for performing prohibition of driving or allowance of redriving for at least one of the light source, the detecting system, and the reading means in cooperation with the turning-on or turning-off the sensor.

27. The image forming device of claim 14, wherein said closing member is an upper surface portion of said casing.

28. The image forming device of claim 14, wherein said closing member is the bottom portion of the casing having reading means arranged therein.

29. The image forming device of claim 14, wherein said at least one access opening is of a size corresponding to one of said light source, said deflecting system and said lens group.

30. An image forming apparatus having a reading scanner to read image information from an original placed on a contact glass and an exposure device to effect an exposure over a photosensitive body with the image information from said reading scanner, said exposure device comprising at least a laser diode unit, a polygon motor unit to deflect a beam from said laser diode unit, a lens group to image the beam scanned by said polygon motor unit on said photosensitive body, and an exposure casing having an open part which houses said laser diode unit polygon motor unit and lens group, and said exposure casing being tightly closed by a closing member, said exposure casing including a bottom portion and a side surface portion, said laser diode unit, said polygon motor unit and said lens group being arranged on said bottom portion of said exposure casing, wherein at least one access opening is provided in said exposure casing at such a position to oppose one of at least the laser diode unit, the polygon motor unit and the lens group of said exposure device, and including at least one cover member for covering a corresponding said access opening.

31. The image forming device of claim 30, wherein access openings are provided in said casing at such positions as opposing at least one of the laser diode unit and the polygon motor unit.

* * * * *